United States Patent
Chen et al.

(10) Patent No.: US 9,295,056 B2
(45) Date of Patent: Mar. 22, 2016

(54) SYSTEMS AND METHODS FOR SIGNALING AND DETERMINING TRANSMISSION TIME INTERVAL BUNDLING PARAMETERS

(71) Applicant: QUALCOMM Incorporated, San Diego, CA (US)

(72) Inventors: Wanshi Chen, San Diego, CA (US); Hao Xu, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 309 days.

(21) Appl. No.: 13/804,307

(22) Filed: Mar. 14, 2013

(65) Prior Publication Data

US 2013/0250924 A1    Sep. 26, 2013

Related U.S. Application Data

(60) Provisional application No. 61/614,916, filed on Mar. 23, 2012.

(51) Int. Cl.
*H04W 72/04* (2009.01)
*H04L 1/18* (2006.01)
*H04L 1/16* (2006.01)

(52) U.S. Cl.
CPC ......... *H04W 72/0446* (2013.01); *H04L 1/1819* (2013.01); *H04L 1/1864* (2013.01); *H04L 1/1893* (2013.01); *H04L 1/1664* (2013.01)

(58) Field of Classification Search
CPC .. H04W 72/0446; H04W 72/00; H04W 72/04
See application file for complete search history.

(56) References Cited

U.S. PATENT DOCUMENTS

| 8,296,616 | B2 | 10/2012 | Wu | |
|---|---|---|---|---|
| 2009/0257408 | A1* | 10/2009 | Zhang et al. | 370/336 |
| 2010/0034158 | A1 | 2/2010 | Meylan | |
| 2010/0150114 | A1 | 6/2010 | Che | |
| 2010/0275086 | A1* | 10/2010 | Bergquist et al. | 714/748 |
| 2011/0038352 | A1* | 2/2011 | Bergman et al. | 370/331 |

(Continued)

FOREIGN PATENT DOCUMENTS

WO    WO-2009131509 A1    10/2009

OTHER PUBLICATIONS

Huawei: "GCF Priority 2: Update of MAC TC7.1.4.14 TTI Bundling", 3GPP Draft; R5-094631 GCF Priority 2 Update of MAC TC 7.1.4.14 TTI Bundling, 3rd Generation Partnership Project (3GPP), Mobile Competence Centre ; 650, Route Deslucioles ; F-06921 Sophia-Antipolis Cedex; France, no. Shenzhen, China; 20090814, Aug. 14, 2009, XP050355158, [retrieved on Aug. 14, 2009] section 7.1.4.14.1.

(Continued)

*Primary Examiner* — Anh Ngoc Nguyen
(74) *Attorney, Agent, or Firm* — Austin Rapp & Hardman

(57) ABSTRACT

A method for determining transmission time interval (TTI) bundling parameters on a wireless communication device is described. The method includes receiving signaling that indicates a TTI bundling configuration. The method also includes receiving signaling that indicates an uplink grant. The method further includes determining at least one TTI bundling parameter based on the TTI bundling configuration and the uplink grant. The method additionally includes transmitting a signal based on the at least one TTI bundling parameter.

59 Claims, 19 Drawing Sheets

(56) References Cited

U.S. PATENT DOCUMENTS

2011/0223900 A1* 9/2011 Yu et al. ...................... 455/422.1
2011/0280212 A1   11/2011 Lv
2012/0182958 A1   7/2012 Pelletier et al.

OTHER PUBLICATIONS

International Search Report and Written Opinion—PCT/US2013/032775—ISA/EPO—Oct. 14, 2013.

Partial International Search Report—PCT/US2013/032775—ISA/EPO—Jul. 5, 2013.
Susitaival R. et al., "LTE Coverage Improvement by TTI Bundling", 2009 IEEE 69th Vehicular Technology Conference, Apr. 26-29, 2009, Barcelona, Spain, IEEE, Piscataway, NJ, USA, Apr. 26, 2009, pp. 1-5, XP031474607, ISBN: 978-1-4244-2517-4, abstract, figure 3 section III, TTI bundling.

* cited by examiner

SYSTEMS AND METHODS FOR SIGNALING AND DETERMINING TRANSMISSION TIME INTERVAL BUNDLING PARAMETERS

RELATED APPLICATIONS

This application is related to and claims priority from U.S. Provisional Patent Application Ser. No. 61/614,916, filed Mar. 23, 2012, for "DEVICES FOR SIGNALING AND DETERMINING TRANSMISSION TIME INTERVAL BUNDLING PARAMETERS", which is incorporated herein by reference in its entirety.

TECHNICAL FIELD

The present disclosure relates generally to electronic devices. More specifically, the present disclosure relates to systems and methods for signaling and determining transmission time interval (TTI) bundling parameters.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform functions faster, more efficiently or with higher quality are often sought after.

Some electronic devices (e.g., cellular phones, smart phones, computers, etc.) communicate with other electronic devices. For example, a cellular phone may wirelessly communicate with a base station by transmitting and receiving electromagnetic signals over the air.

The efficiency of communications between wireless communication devices may depend on the flexibility of the communications channel. For example, a communications channel may be structured such that a large amount of overhead is required to send information over the channel. This may degrade communication efficiency. As can be observed from this discussion, systems and methods that improve communication efficiency may be beneficial.

SUMMARY

A method for determining transmission time interval (TTI) bundling parameters on a wireless communication device is described. The method includes receiving signaling that indicates a TTI bundling configuration. The method also includes receiving signaling that indicates an uplink grant. The method further includes determining at least one TTI bundling parameter based on the TTI bundling configuration and the uplink grant. The method additionally includes transmitting a signal based on the at least one TTI bundling parameter.

Determining the at least one TTI bundling parameter may include determining a subset of subframes for uplink shared channel (UL-SCH) transmissions. Determining the at least one TTI bundling parameter may also include determining one or more uplink hybrid automatic repeat request (UL-HARD) processes for uplink shared channel (UL-SCH) transmissions.

Determining the at least one TTI bundling parameter may further include determining a transport block size (TBS) determination scheme. Determining the TBS determination scheme may be based on at least one of a group consisting of semi-static, dynamic signaling and implicit signaling.

Determining the at least one TTI bundling parameter may also include determining a redundancy version (RV) determination scheme. Determining the RV determination scheme may be based on at least one of a group consisting of a transport block size (TBS) determination scheme, systematic bits, two or more subframes and eight RV values. Determining the RV determination scheme may also be based on signaling that is separate from transport block size (TBS) determination scheme signaling or may be based on a TBS determination scheme.

Determining the at least one TTI bundling parameter may also include determining whether TTI bundling is enabled for uplink multiple-input multiple-output (UL-MIMO) transmissions. Determining the at least one TTI bundling parameter may include determining a TTI bundling size based on whether TTI bundling is enabled for UL-MIMO transmissions. Determining the at least one TTI bundling parameter may also include determining at least one of a transport block size (TBS) determination scheme and a redundancy version (RV) determination scheme based on whether TTI bundling is enabled for UL-MIMO transmissions.

Whether TTI bundling is enabled for rank-1 UL-MIMO transmissions may be determined based on a downlink control information (DCI) format 4. A same beamforming vector may be applied to all subframes involved in TTI bundling or a beamforming vector may follow a predefined pattern if TTI bundling is enabled for UL-MIMO transmissions. A beamforming vector may be applied for all semi-persistent scheduled (SPS) transmissions without a physical downlink control channel (PDCCH) if the DCI format 4 is used to activate uplink semi-persistent scheduling. A beamforming vector may be applied for all physical uplink shared channel (PUSCH) transmissions without a physical downlink control channel (PDCCH). The beamforming vector may include one of a group consisting of a beamforming vector following a latest beamforming vector, a beamforming vector following a fixed beamforming vector and a beamforming vector based on wireless communication device implementation.

Determining the at least one TTI bundling parameter may also include determining at least one of a TTI bundling size, a transport block size (TBS) determination scheme and a redundancy version (RV) determination scheme based on a downlink control information (DCI) format 0 or a DCI format 4.

Determining the at least one TTI bundling parameter may further include determining whether to multiplex channel state information (CSI) with uplink shared channel (UL-SCH) information in a TTI bundling. Determining whether to multiplex the CSI may be based on explicit or implicit signaling. Only certain types of CSI may be multiplexed if it is determined to multiplex CSI. Determining whether to multiplex CSI may be based on power limitation conditions. Uplink control information (UCI) may be piggybacked onto a physical uplink shared channel (PUSCH) for a single subframe or TTI bundling for UCI may be allowed. Acknowledgement/negative acknowledgement (ACK/NAK) may be multiplexed onto a physical uplink shared channel (PUSCH) with TTI bundling.

Determining the at least one TTI bundling parameter may also include determining whether subframes in a TTI bundling are consecutive or non-consecutive. Determining the at least one TTI bundling parameter may further include determining a number of subframes in a TTI bundling.

A method for determining transmission time interval (TTI) bundling parameters on a base station is also described. The method includes determining at least one TTI bundling parameter. The method also includes indicating the at least one TTI bundling parameter based on a TTI bundling configuration and an uplink grant. The method further includes receiving a signal based on the at least one TTI bundling parameter.

A wireless communication device for determining transmission time interval (TTI) bundling parameters is also described. The wireless communication device includes circuitry configured to receive signaling that indicates a TTI bundling configuration. The circuitry is also configured to receive signaling that indicates an uplink grant. The circuitry is further configured to determine at least one TTI bundling parameter based on the TTI bundling configuration and the uplink grant. The circuitry is additionally configured to transmit a signal based on the at least one TTI bundling parameter.

A computer-program product for determining transmission time interval (TTI) bundling parameters is also described. The computer-program product includes a non-transitory tangible computer-readable medium having instructions thereon. The instructions include code for causing a wireless communication device to receive signaling that indicates a TTI bundling configuration. The instructions also include code for causing the wireless communication device to receive signaling that indicates an uplink grant. The instructions further include code for causing the wireless communication device to determine at least one TTI bundling parameter based on the TTI bundling configuration and the uplink grant. The instructions additionally include code for causing the wireless communication device to transmit a signal based on the at least one TTI bundling parameter.

An apparatus for determining transmission time interval (TTI) bundling parameters is also described. The apparatus includes means for receiving signaling that indicates a TTI bundling configuration. The apparatus also includes means for receiving signaling that indicates an uplink grant. The apparatus further includes means for determining at least one TTI bundling parameter based on the TTI bundling configuration and the uplink grant. The apparatus additionally includes means for transmitting a signal based on the at least one TTI bundling parameter.

DETAILED DESCRIPTION

Figure 1:
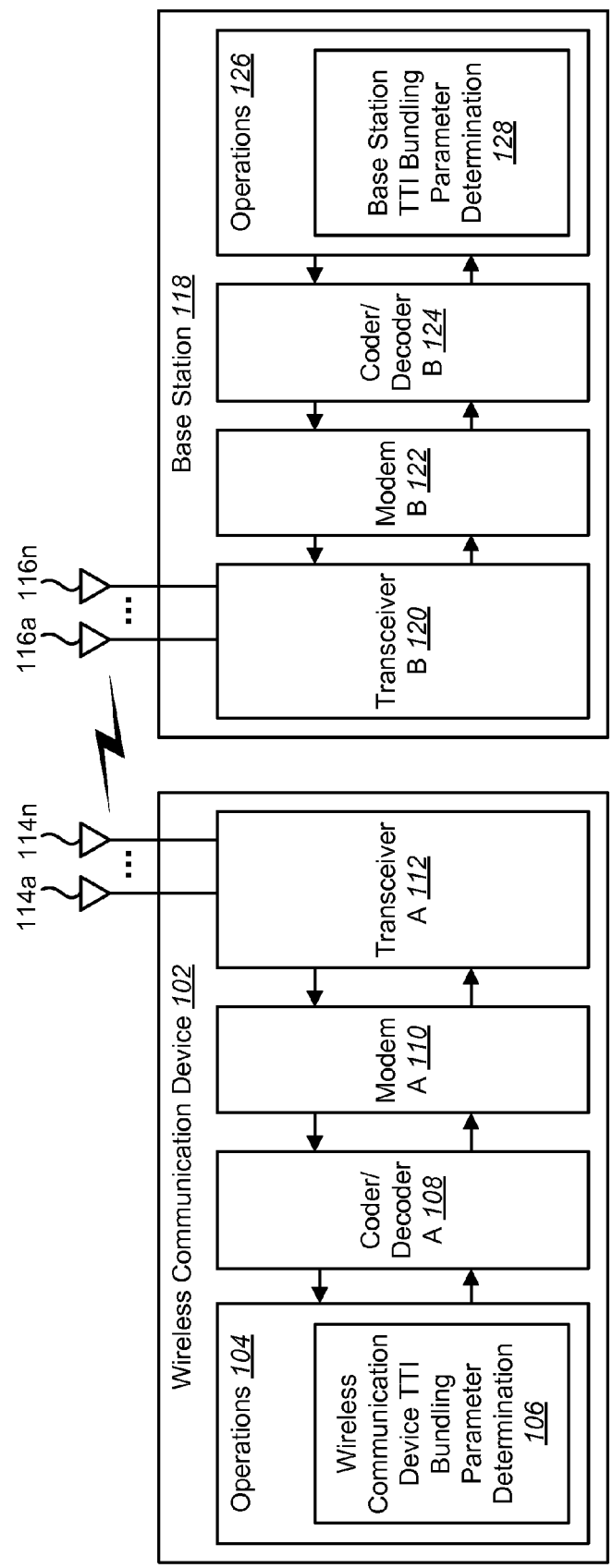
FIG. 1 is a block diagram illustrating one configuration of a wireless communication device and a base station in which systems and methods for determining transmission time interval (TTI) bundling parameters may be implemented.

It should be noted that the systems and methods disclosed herein may be described in terms of one or more specifications, such as the 3rd Generation Partnership Project (3GPP) Release-8 (Rel-8), 3GPP Release-9 (Rel-9), 3GPP Release-10 (Rel-10), Long-Term Evolution (LTE), LTE-Advanced (LTE-A), etc. However, at least some of the concepts described herein may be applied to other wireless communication systems. For example, the term User Equipment (UE) may be used to refer to the more general term "wireless communication device." Furthermore, one or more of the terms Node B, Evolved Node B (eNB), Home Evolved Node B (HeNB), etc., may be used to refer to the more general term "base station."

Examples of communication devices include cellular telephone base stations or nodes, access points, wireless gateways and wireless routers. A communication device may operate in accordance with certain industry standards, such as Third Generation Partnership Project (3GPP) Long Term Evolution (LTE) standards. Other examples of standards that a communication device may comply with include Institute of Electrical and Electronics Engineers (IEEE) 802.11a, 802.11b, 802.11g, 802.11n and/or 802.11ac (e.g., Wireless Fidelity or "Wi-Fi") standards, IEEE 802.16 (e.g., Worldwide Interoperability for Microwave Access or "WiMAX") standards, CDMA 2000 1x (referred to herein as "1x", may also be referred to as IS-2000 or 1xRTT) standards, Evolution-Data Optimized (EVDO) standards, Interim Standard 95 (IS-95), High Rate Packet Data (HRPD), evolved High Rate Packet Data (eHRPD) radio standards and others. In some standards, a communication device may be referred to as a Node B, evolved Node B, etc. While some of the systems and methods disclosed herein may be described in terms of one or more standards, this should not limit the scope of the disclosure, as the systems and methods may be applicable to many systems and/or standards.

Some communication devices (e.g., access terminals, client devices, client stations, etc.) may wirelessly communicate with other communication devices. Some communication devices (e.g., wireless communication devices) may be referred to as mobile devices, mobile stations, subscriber stations, clients, client stations, user equipment (UEs), remote stations, access terminals, mobile terminals, terminals, user terminals, subscriber units, etc. Additional examples of communication devices include laptop or desktop computers, cellular phones, smart phones, wireless modems, e-readers, tablet devices, gaming systems, etc. Some of these communication devices may operate in accordance with one or more industry standards as described above. Thus, the general term "communication device" may include communication devices described with varying nomenclatures according to industry standards (e.g., access terminal, user equipment, remote terminal, access point, base station, Node B, evolved Node B, etc.).

The systems and methods disclosed herein may be described with reference to one or more specifications, such as 3GPP Release-8, 3GPP Release-9, 3GPP Release-10, LTE and LTE Advanced (LTE-A). However, the concepts may also be applied to other wireless communication systems.

The terms "networks" and "systems" are often used interchangeably. A CDMA network may implement a radio technology such as Universal Terrestrial Radio Access (UTRA), cdma2000, etc. UTRA includes W-CDMA and Low Chip Rate (LCR) while cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from 3GPP. cdma2000 is described in documents from an organization named "3rd Generation Partnership Project 2" (3GPP2). For clarity, certain aspects of the techniques are described below for LTE, and LTE terminology is used in much of the description below.

The systems and methods disclosed herein describe transmission time interval (TTI) bundling for coverage enhancements in LTE-A. In a known approach, TTI bundling may be used mainly for low rate traffic. If voice over Internet Protocol (VoIP) packets cannot be transmitted in a single TTI due to a low uplink (UL) link budget, Layer 2 (L2) segmentation may be applied. For example, to achieve sufficient coverage, a VoIP packet may be segmented into four radio link control (RLC) packet data units (PDUs) that are transmitted in four consecutive TTIs. Additionally, two or three hybrid automatic repeat request (HARQ) retransmissions might be targeted.

This approach has three drawbacks. First, each additional segment introduces a one byte of RLC, a one byte of media access control (MAC) and 3 bytes of Layer 1 (L1) cyclic redundancy check (CRC) overhead. This may result in 15% overhead assuming a 33 byte RLC service data unit (SDU) size. This means that for four segments, there is an additional overhead of 45% associated with L1 and L2. Second, HARQ transmissions or retransmissions for every segment may require uplink grants on a physical downlink control channel (PDCCH), which consumes significant PDCCH resources. Third, each HARQ transmission or retransmission is followed by HARQ feedback on a physical HARQ indicator channel (PHICH). Assuming a NAK-ACK error ratio of $10^{-3}$, the large number of HARQ feedback signals leads to high packet loss probabilities. For example, if 12 HARQ feedback signals are sent, the HARQ feedback error ratio might be in the order of $1.2*10^{-2}$. However, packet loss rates of more than $10^{-2}$ are considered unacceptable for VoIP traffic.

It may be advantageous to use only a single uplink grant and a single PHICH signal per TTI bundle. Also, TTI bundling may reduce (e.g., minimize) L1 and L2 overhead because no L2 segmentation is required.

In LTE Rel-8/9/10, TTI bundling (also referred to as subframe bundling) may be configured on the basis of an individual wireless communication device. It should be noted that the terms subframe and transmission time interval (TTI) may be used interchangeably herein. The TTI bundling operation may be configured by a TTI bundling parameter provided by higher layers. One example of a TTI bundling parameter is ttiBundling provided by higher layers. If TTI bundling is configured for a wireless communication device, the TTI bundling operation is only applied to an uplink shared channel (UL-SCH). For example, the TTI bundling operation is not applied to other UL signals or traffic (e.g., uplink control information (UCI)). The TTI bundling size is fixed at 4 (subframes) and is applicable to all uplink subframes for a UL-SCH information transmission. Therefore, a physical uplink shared channel (PUSCH) carrying UL-SCH information will be transmitted in four consecutive subframes. The same HARQ process number is used in each of the TTI bundled subframes. The resource allocation size is restricted to up to 3 resource blocks (RBs). The modulation order is set to 2 (e.g. quadrature phase shift keying (QPSK)).

Furthermore, in LTE Rel-8/9/10, a TTI bundle is treated as a single resource. In other words, a single grant and a single HARQ acknowledgement are used for each TTI bundle. If an UL-SCH transmission in a TTI bundling operation collides with a periodic channel state information (P-CSI) reporting instance, then the wireless communication device drops the P-CSI report of a given physical uplink control channel (PUCCH) reporting type in that subframe and does not multiplex the P-CSI report payload in the PUSCH transmission in that subframe. A wireless communication device is not expected to be configured with a simultaneous PUCCH and PUSCH transmission when UL-SCH TTI bundling is configured.

Figure 13:
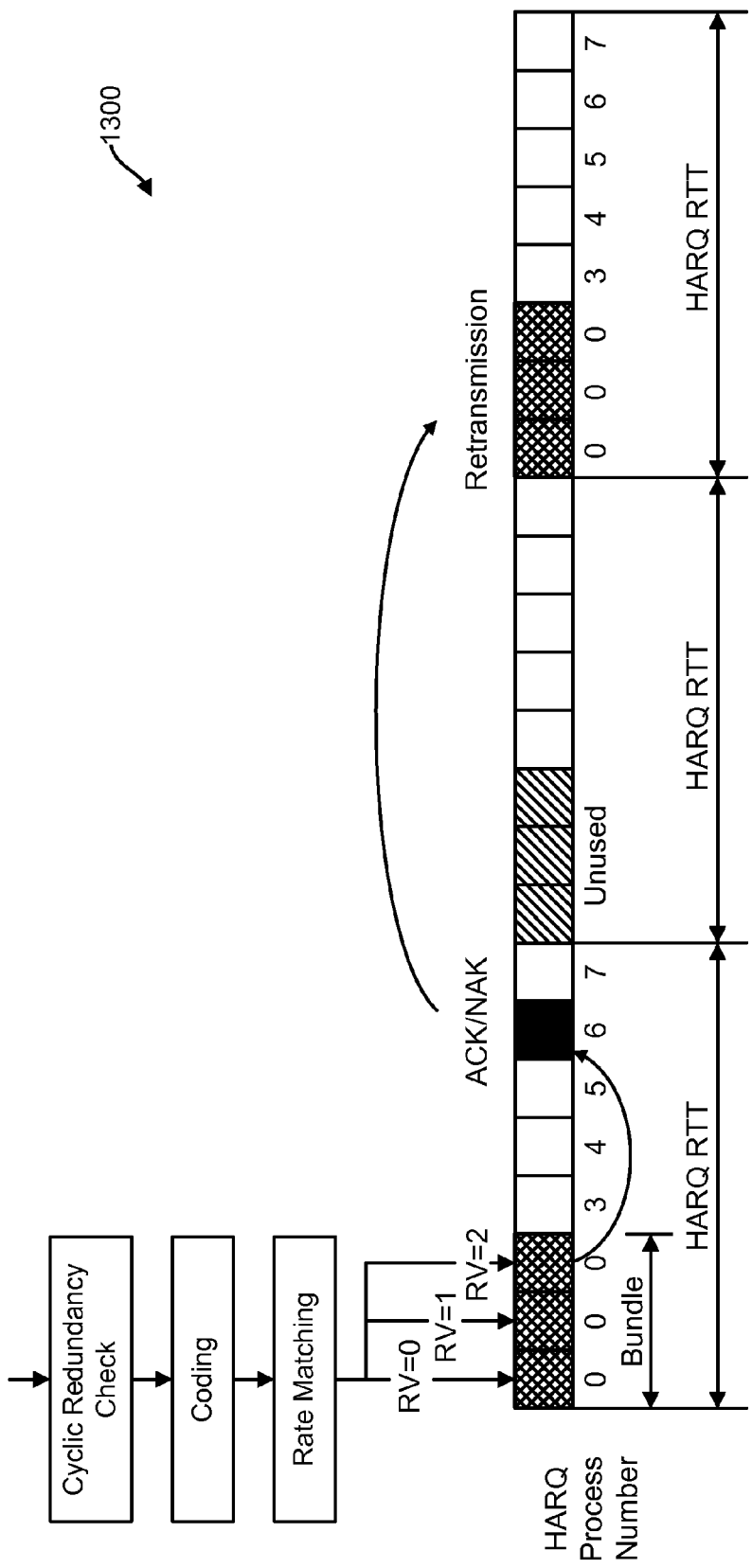
FIG. 13 shows an example of a timeline according to alternative-1 for HARQ timing for TTI bundling in FDD.

Three alternatives on HARQ timing for TTI bundling were discussed when LTE Rel-8 was finalized. In alternative-1 (as shown in FIG. 13), the timing relationship between the last subframe in the TTI bundle and the transmission instant of the HARQ acknowledgement is identical to the case of no TTI bundling. For the case of frequency-division duplexing (FDD), if the last subframe in a TTI bundle is subframe n, then the acknowledgement is transmitted in subframe n+4. For the case of FDD, if the first subframe in a TTI bundle is subframe k, then any HARQ retransmission begins in subframe k+2*HARQ retransmission timing (RTT).

Figure 14:
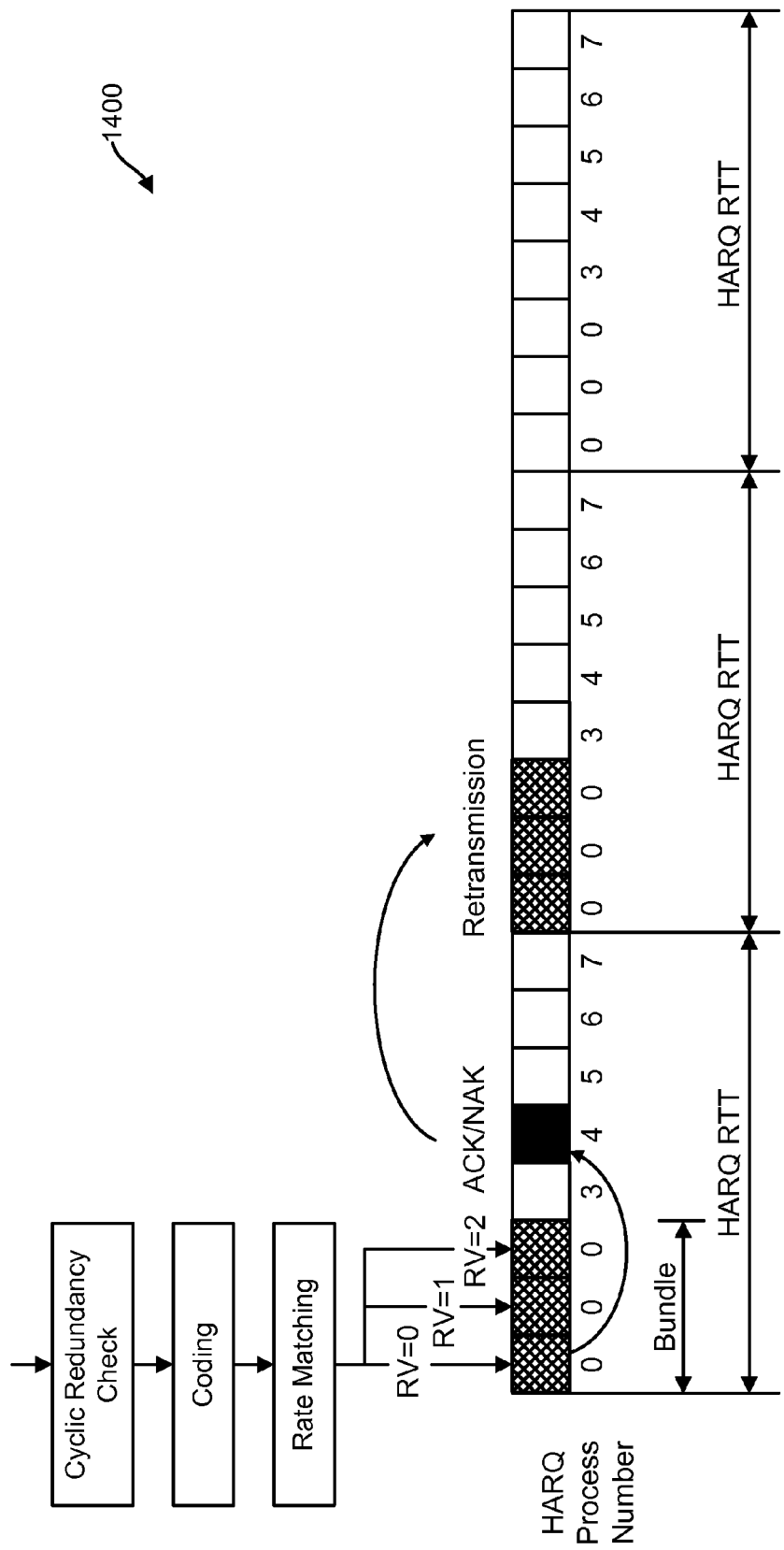
FIG. 14 shows an example of a timeline according to alternative-2 for HARQ timing for TTI bundling in FDD.

In alternative-2 (as shown in FIG. 14), the timing relationship between the first subframe in the TTI bundle and the transmission instant of the HARQ acknowledgement is identical to the case of no TTI bundling. For the case of FDD, the HARQ acknowledgement is obtained from decoding the first subframe only.

Figure 15:
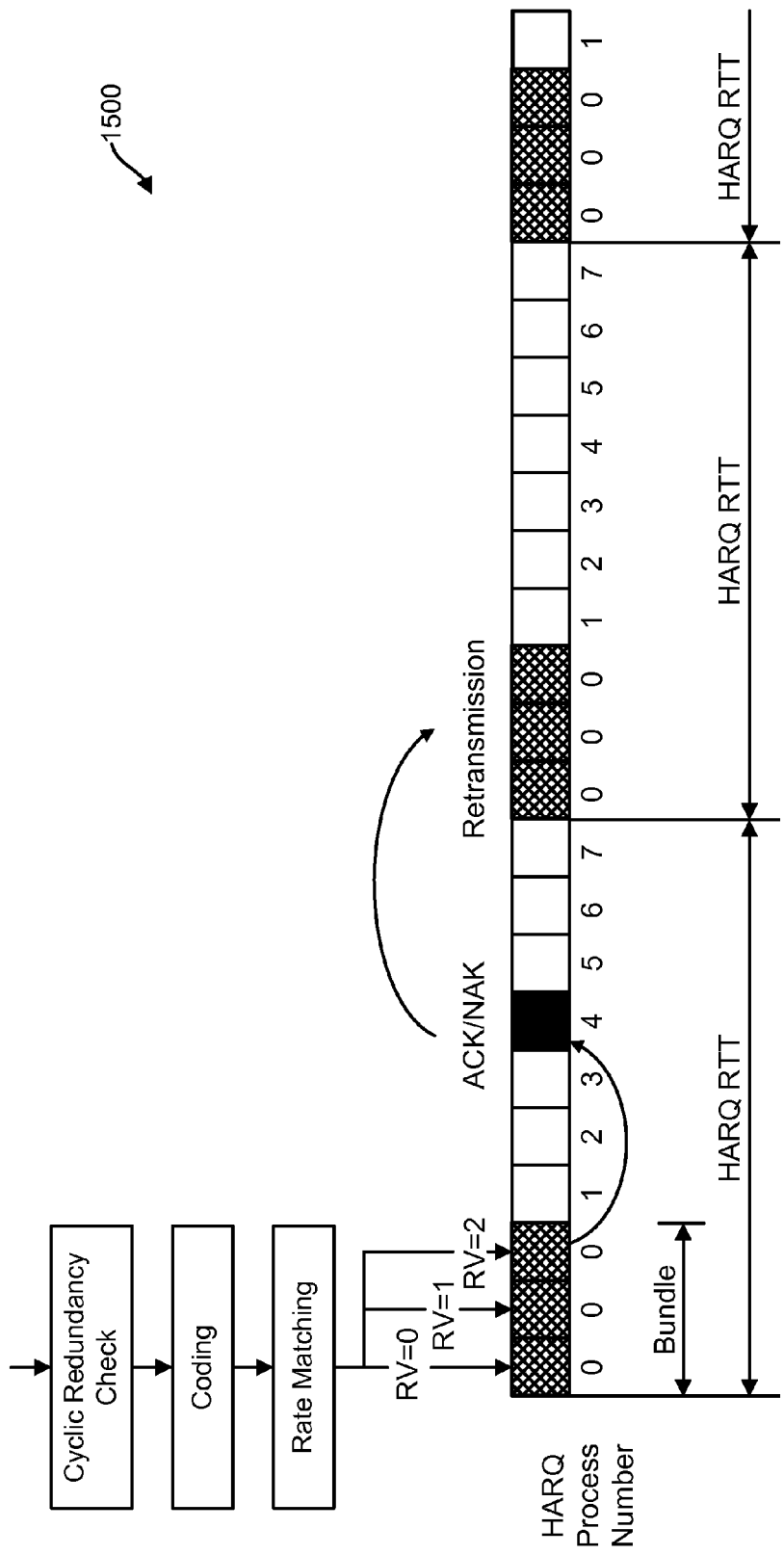
FIG. 15 shows an example of a timeline according to alternative-3 for HARQ timing for TTI bundling in FDD.

In alternative-3 (as shown in FIG. 15), the timing relationship between the last subframe in the TTI bundle and the transmission instant of the HARQ acknowledgement is identical to the case of no TTI bundling. For the case of FDD, if the last subframe in a TTI bundle is subframe n, then the acknowledgement is transmitted in subframe n+4. In this case, the HARQ RTT is different than for the non-bundling case to reduce delays.

Figure 16:
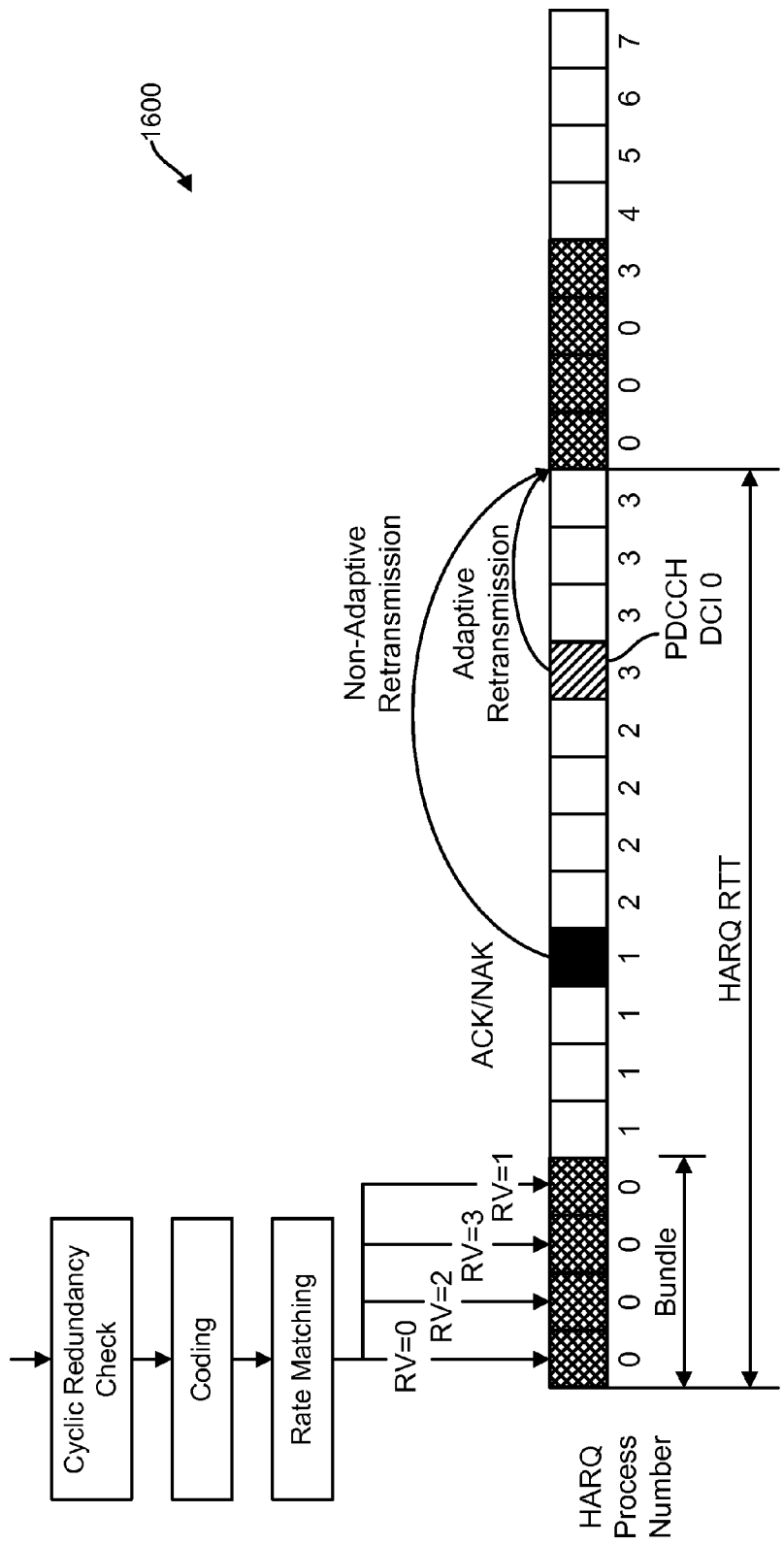
FIG. 16 shows an example of a timeline according to an alternative for HARQ timing for TTI bundling in FDD with a bundling size of four subframes.

Among the three design alternatives, alternative-3 was chosen for Rel-8. In particular, for FDD, when TTI bundling is configured, there are 4 uplink hybrid automatic repeat request (UL-HARQ) processes (as shown in FIG. 16). It should be noted that when there is no TTI bundling, there are 8 UL-HARQ processes for uplink single-input multiple-output (UL-SIMO) operation and 16 UL-HARQ processes for uplink multiple-input multiple-output (UL-MIMO) operation. Furthermore, in this known approach, there is no TTI bundling for UL-MIMO operation. For example, uplink grants only come from downlink control information (DCI) format 0. In the timeline for this procedure, a PUSCH transmission that starts from subframe n+4 can be triggered by DCI format 0 at subframe n (for adaptive transmission and/or retransmission) or a PHICH at subframe n−5 (for non-adaptive retransmission). The HARQ RTT is fixed at 16 milliseconds (ms).

Figure 17:
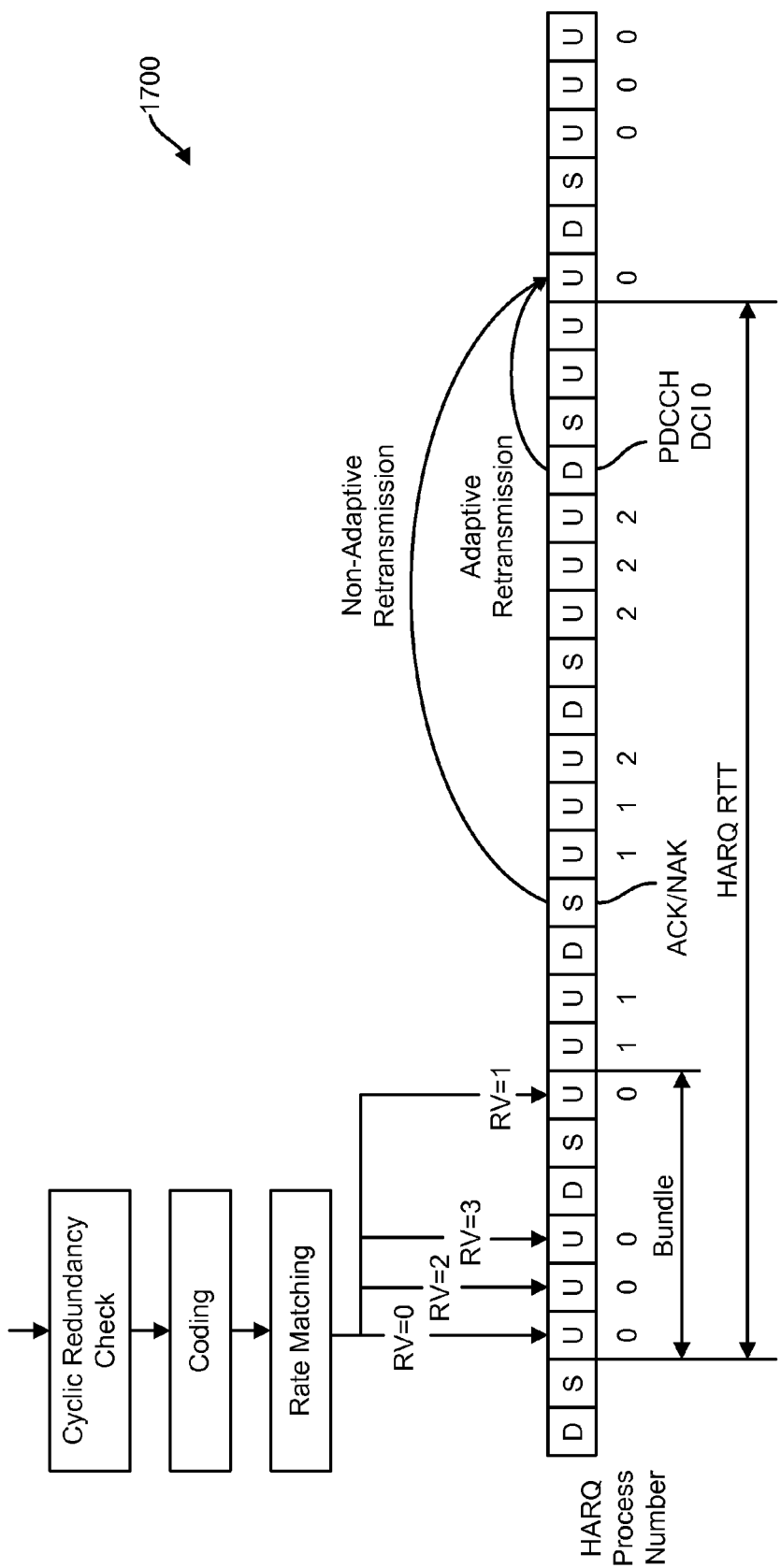
FIG. 17 shows an example of a timeline for HARQ timing for TTI bundling in TDD DL/UL configuration 0.
Figure 18:
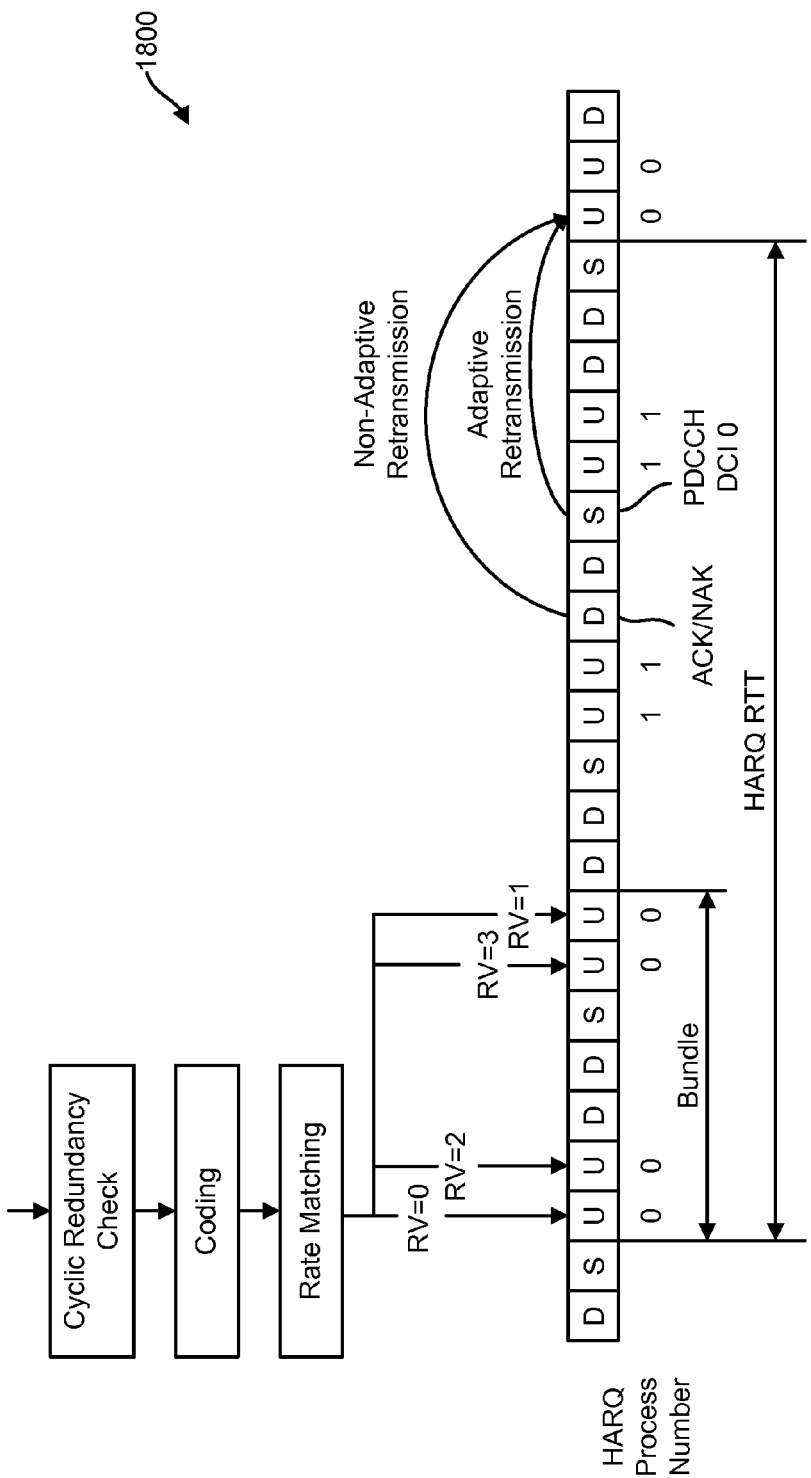
FIG. 18 shows an example of a timeline for HARQ timing for TTI bundling in TDD DL/UL configuration 1.
Figure 19:
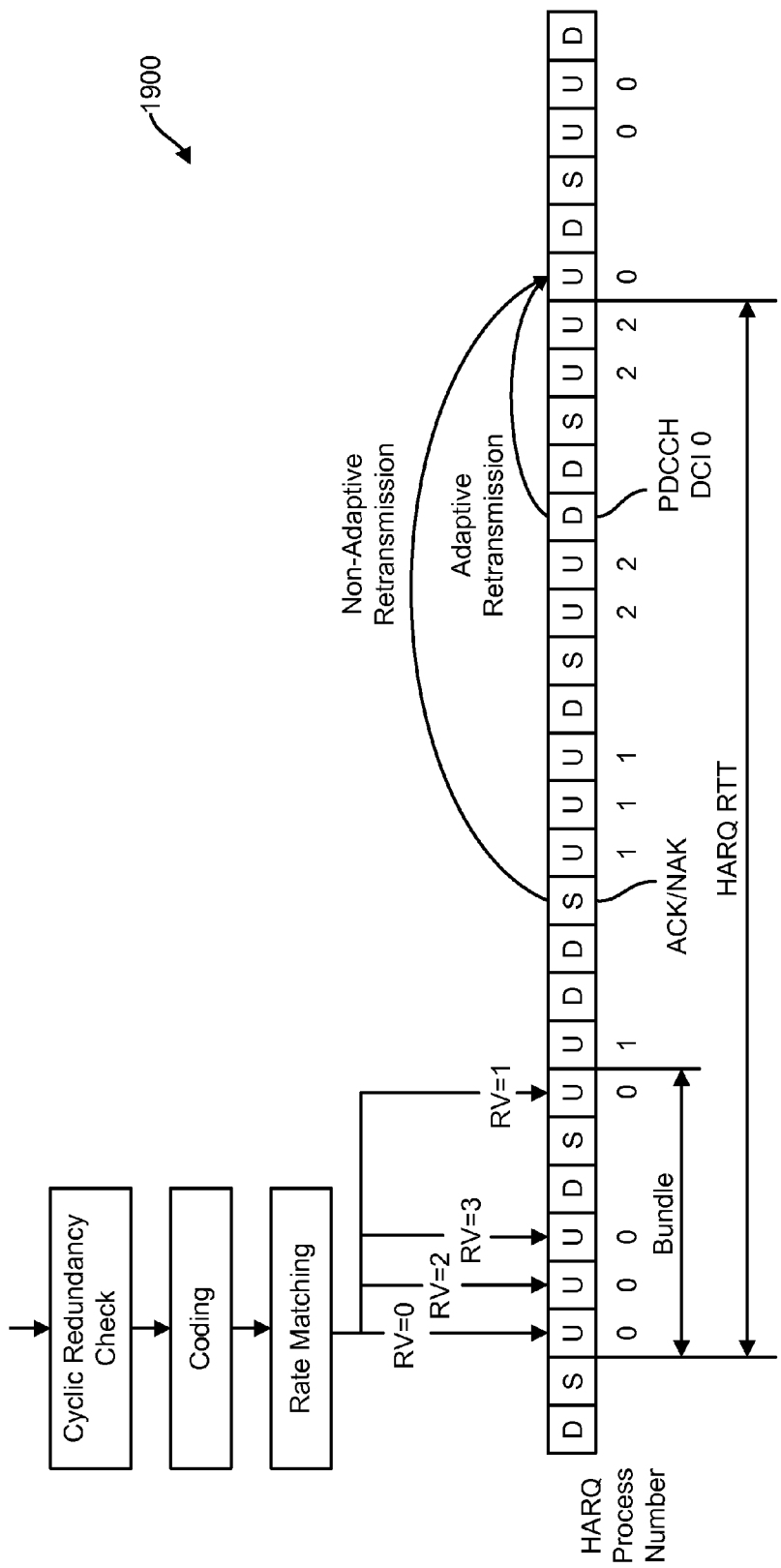
FIG. 19 shows an example of a timeline for HARQ timing for TTI bundling in TDD DL/UL configuration 6.

For time-division duplexing (TDD), TTI bundling is supported for downlink/uplink (DL/UL) configurations 0, 1, and 6. DL/UL configuration 0 is illustrated in FIG. 17. DL/UL configuration 1 is illustrated in FIG. 18. DL/UL configuration 6 is illustrated in FIG. 19. Other configurations do not have a sufficient number of UL subframes for TTI bundling, considering the need of reducing the HARQ delay introduced by TTI bundling (e.g., for VoIP type applications). The TTI bundle size is fixed at 4 subframes.

For UL-MIMO, the number of HARQ processes per serving cell for the non-TTI bundling operation is at least twice the number determined by the DL/UL configurations shown in Table (1) below. Furthermore, for UL-MIMO there are two HARQ processes associated with a given subframe. Additionally, TTI bundling cannot be configured with UL-MIMO operation (in accordance with the known approach).

TABLE (1)

| TDD DL/UL configuration | Number of HARQ processes for normal HARQ operation | Number of HARQ processes for TTI bundling operation |
| --- | --- | --- |
| 0 | 7 | 3 |
| 1 | 4 | 2 |
| 2 | 2 | N/A |
| 3 | 3 | N/A |
| 4 | 2 | N/A |
| 5 | 1 | N/A |
| 6 | 6 | 3 |

For a non-TTI-bundling case, a transport block size (TBS) is determined based on two parameters in UL grants. In one configuration, the TBS is determined based on the MCS index ($n_{MCS}$) and the number of assigned resource blocks (RBs) for the subframe ($n_{RB\_subframe}$). Therefore, in this configuration, TBS may be determined as shown in Equation (1):

$$TBS = f(n_{MCS}, n_{RB\_subframe}). \quad (1)$$

However, for a TTI bundling case, there are two possible design alternatives for determining the TBS discussed in Rel-8. In alternative-1, the TBS is determined based on the MCS index ($n_{MCS}$) and the number of assigned resource blocks (RBs) for the subframe ($n_{RB\_subframe}$). The TBS according to alternative-1 may be determined as shown in Equation (2):

$$TBS\_ttibundling = f(n_{MCS}, n_{RB\_subframe}). \quad (2)$$

In Equation (2), TBS_ttibundling is the TBS for a TTI bundling case. It should be noted that this is the same as the non-TTI-bundling case described above in connection with Equation (1).

In alternative-2, the TBS is determined based on the MCS index ($n_{MCS}$) the number of assigned resource blocks (RBs) for the subframe ($n_{RB\_subframe}$) and the TTI bundling size ($N_{bundle}$). The TBS according to alternative-2 may be determined as shown in Equation (3):

$$TBS\_ttibundling = f(n_{MCS}, n_{RB\_subframe} * N_{bundle}). \quad (3)$$

In Equation (3), TBS_ttibundling is the TBS for a TTI bundling case. It should be noted that according to this known approach, $N_{bundle}$ equals 4. Alternative-1 was chosen for LTE Rel-8/9/10, when TTI bundling is configured. Therefore, the TBS determination for TTI bundling is the same as the non-TTI-bundling case.

In the known approach, the TTI bundling operation relies on the HARQ entity for invoking the same HARQ process for each transmission that is part of the same TTI bundle. Within a TTI bundle, HARQ retransmissions may be non-adaptive and may be triggered without waiting for feedback from previous transmissions. In this scenario, the TTI bundle size (e.g., TTI_BUNDLE_SIZE) is equal to 4. The HARQ feedback of a TTI bundle is only received for the last TTI of the TTI bundle (e.g., the TTI corresponding to TTI_BUNDLE_SIZE), regardless of whether a transmission in that TTI takes place or not (e.g., when a measurement gap occurs).

In the known approach, a retransmission of a TTI bundle is also a TTI bundle. TTI bundling is not supported when the wireless communication device is configured with one or more secondary cells (SCells) with a configured uplink. TTI bundling is also not supported for relay node (RN) communication with the evolved universal terrestrial radio access network (E-UTRAN) in combination with an RN subframe configuration. Furthermore, for transmission of an Msg3 during Random Access (RA), TTI bundling does not apply.

The redundancy version (RV) for the PUSCH transmissions in the same TTI bundle follows the same handling as non-adaptive re-transmissions. Specifically, the RV follows a {0, 2, 3, 1} pattern. For example, the RV follows a {0, 2, 3, 1} pattern for the {$1^{st}, 2^{nd}, 3^{rd}, 4^{th}$} subframe in the TTI bundle for PUSCH transmissions.

In the known approach, PUSCH hopping can be enabled via inter-subframe hopping. In one configuration, PUSCH hopping can be enabled on a per wireless communication device basis. Both type 1 and type 2 PUSCH hopping can be supported.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of a wireless communication device 102 and a base station 118 in which systems and methods for determining transmission time interval (TTI) bundling parameters may be implemented. The wireless communication device 102 may communicate with a base station 118. For example, the wireless communication device 102 and base station 118 may communicate with each other by transmitting and/or receiving electromagnetic signals. The wireless communication device 102 may communicate with zero, one or multiple base stations 118 on a downlink (DL) and/or an uplink (UL) at any given moment. The downlink (or forward link) refers to the communication link from a base station 118 to a wireless communication device 102, and the uplink (or reverse link) refers to the communication link from a wireless communication device 102 to a base station 118.

The wireless communication device 102 may include an operations block/module 104, coder/decoder A 108, modem A 110, transceiver A 112 and/or one or more antennas 114a-n. As used herein, the term "block/module" may indicate that a particular element may be implemented in hardware, software, firmware or any combination thereof. For example, the operations block/module 104 may be implemented in hardware (e.g., circuitry), software or a combination of both. It should also be noted that one or more of the elements illustrated in FIG. 1 may be implemented in circuitry (e.g., integrated circuitry) in some configurations.

Transceiver A 112 may receive one or more signals and/or may transmit one or more signals using the one or more antennas 114a-n. For example, transceiver A 112 may receive, amplify and downconvert a signal (e.g., a TTI bundling configuration and an uplink grant) from the base station 118, which it may provide to modem A 110. Transceiver A 112 may also obtain a modulated signal provided by modem A 110. Transceiver A 112 may upconvert, amplify and transmit the modulated signal using the one or more antennas 114a-n.

Modem A 110 may modulate and/or demodulate signals. For example, modem A 110 may demodulate a signal provided by transceiver A 112 and may provide the demodulated signal to coder/decoder A 108. Modem A 110 may also modulate an encoded signal provided by coder/decoder A 108, which modem A 110 may provide to transceiver A 112 as a modulated signal.

Coder/decoder A 108 may encode and/or decode signals. For example, coder/decoder A 108 may decode a demodulated signal provided by modem A 110, which coder/decoder A 108 may provide to the operations block/module 104. Coder/decoder A 108 may also encode a signal provided by the operations block/module 104, which coder/decoder A 108 may provide to modem A 110.

The operations block/module 104 may generate feedback (e.g., Channel Quality Indicator (CQI), Precoding Matrix Indicator (PMI), Rank Indicator (RI) and/or Acknowledgment/Negative Acknowledgement (ACK/NAK)) based on the signal received from the base station 118. For example, the operations block/module 104 may measure one or more channel characteristics (e.g., signal-to-noise ratio (SNR), interference, phase shift, timing, frequency drift, directionality, bit error rate, etc.) and generate feedback that is sent as a report to the base station 118. In some configurations, the report may contain one or more of CQI, PMI, RI, ACK/NAK and/or channel state information (CSI), etc.

The operations block/module 104 may include a wireless communication device TTI bundling parameter determination block/module 106. The wireless communication device TTI bundling parameter determination block/module 106 may determine at least one TTI bundling parameter. In accordance with the systems and methods disclosed herein, various TTI bundling sizes may be utilized for coverage enhancements. Besides the fixed TTI bundling size of 4 (as implemented in the known approach described above), additional TTI bundling sizes (e.g., 2, 8, 20, etc.) may be introduced. The indication of the TTI bundling size for a wireless communication device 102 may be semi-static or dynamic.

However, several issues associated with TTI bundling for coverage enhancement have not been addressed by the known approach. One issue is whether TTI bundling should be enabled for all UL subframes and/or HARQ processes. Another issue is how to determine the TBS and the RV for TTI bundling. Another issue is whether a UL-MIMO DCI format should be used for TTI bundling. Yet another issue is whether other UL signals should be multiplexed with UL-SCH information in TTI bundling.

In a known approach, TTI bundling is applied to all UL-SCH transmissions once TTI bundling is enabled for a wireless communication device 102. However, TTI bundling may be useful for some applications but may not be useful for other applications. The wireless communication device 102 may have multiple concurrent applications. In accordance with the systems and methods disclosed herein, TTI bundling may be selectively enabled for UL-SCH transmissions. For example, TTI bundling may only be enabled in a certain subset of UL subframes and/or UL-HARQ processes. The TTI bundling parameters may also be subframe and/or UL-HARQ dependent. For example, a TTI bundling size of 4 may be applied for some subframes, and a TTI bundling size of 8 may be applied for other subframes.

The wireless communication device TTI bundling parameter determination block/module 106 may receive signaling that indicates a TTI bundling configuration. The signaling may be received from the base station 118. The signaling may include semi-static (e.g., layer 3) signaling, explicit signaling, implicit signaling, power limitation conditions and/or other signaling as described below. The wireless communication device TTI bundling parameter determination block/module 106 may also receive signaling that indicates an uplink grant.

The wireless communication device TTI bundling parameter determination block/module 106 may determine at least one TTI bundling parameter based on the TTI bundling configuration and the uplink grant. For example, the TTI bundling parameters that the wireless communication device TTI bundling parameter determination block/module 106 may determine may include whether TTI bundling is enabled, a TBS determination scheme, a TBS, an RV determination scheme, an RV, one or more subframes for UL-SCH transmissions (for TTI bundling), one or more UL-HARQ processes (for TTI bundling), whether TTI bundling is enabled for MIMO transmissions, whether to multiplex CSI, which CSI to multiplex and/or other TTI bundling parameters described below.

The wireless communication device TTI bundling parameter determination block/module 106 may transmit a signal based on the at least one TTI bundling parameter. For example, the wireless communication device 102 may transmit information (e.g., data) in a TTI bundle as described below.

The base station 118 may include an operations module 126, coder/decoder B 124, modem B 122, transceiver B 120 and/or one or more antennas 116a-n. Transceiver B 120 may receive one or more signals and/or may transmit one or more signals using the one or more antennas 116a-n. For example, transceiver B 120 may receive, amplify and downconvert a signal from the wireless communication device 102, which it may provide to modem B 122. Transceiver B 120 may also obtain a modulated signal provided by modem B 122. Transceiver B 120 may upconvert, amplify and transmit the modulated signal using the one or more antennas 116a-n.

Modem B 122 may modulate and/or demodulate signals. For example, modem B 122 may demodulate a signal provided by transceiver B 120 and provide the demodulated signal to coder/decoder B 124. Modem B 122 may also modulate an encoded signal provided by coder/decoder B 124, which it may provide to transceiver B 120 as a modulated signal.

Coder/decoder B 124 may encode and/or decode signals. For example, coder/decoder B 124 may decode a demodulated signal provided by modem B 122, which it 122 may provide to the operations module 126. Coder/decoder B 124 may also encode a signal provided by the operations module 126, which it 124 may provide to modem B 122.

The base station operations module 126 may include a base station TTI bundling parameter determination block/module 128. The base station TTI bundling parameter determination block/module 128 may determine at least one TTI bundling parameter. For example, the base station TTI bundling parameter determination block/module 128 may determine at least one of whether TTI bundling is enabled, a TBS determination scheme, a TBS, an RV determination scheme, an RV, one or more subframes for UL-SCH transmissions (for TTI bundling), one or more UL-HARQ processes (for TTI bundling), whether TTI bundling is enabled for MIMO transmissions, whether to multiplex CSI, which CSI to multiplex and/or other TTI bundling parameters described below.

The base station TTI bundling parameter determination block/module 128 may indicate the TTI bundling parameter based on a TTI bundling configuration and an uplink grant. The TTI bundling configuration may include semi-static (e.g., layer 3) signaling, explicit signaling, implicit signaling, power limitation conditions and/or other signaling as described below. It should be noted that the base station 118 may determine one or more TTI bundling parameters, which may be signaled to the wireless communication device 102 via one or more TTI bundling configurations and uplink grants.

The base station 118 may receive a signal based on at least one TTI bundling parameter. For example, the base station 118 may receive a TTI bundling transmission from the wireless communication device 102 according to at least one TTI bundling parameter signaled by the base station 118. Therefore, the wireless communication device 102 and/or the base station 118 may be implemented to perform one or more of the functions relating to TTI bundling.

It should be noted that one or more of the elements illustrated as included within the wireless communication device 102 and/or base station 118 may be implemented in hardware, software or a combination of both. For example, the wireless communication device TTI bundling parameter determination block/module 106 may be implemented in hardware, software or a combination of both.

Figure 2:
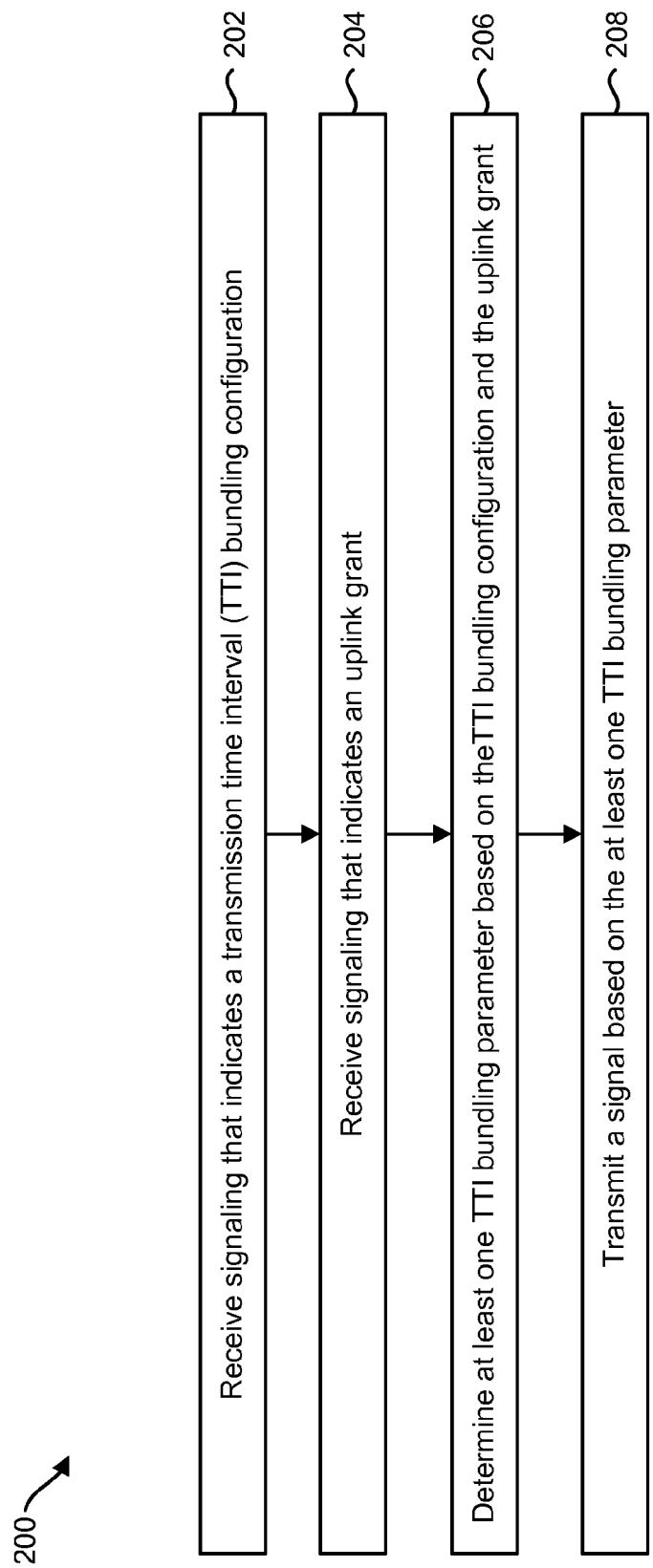
FIG. 2 is a flow diagram illustrating one configuration of a method for determining transmission time interval (TTI) bundling parameters on a wireless communication device.

FIG. 2 is a flow diagram illustrating one configuration of a method 200 for determining transmission time interval (TTI) bundling parameters on a wireless communication device 102. A wireless communication device 102 may receive 202 signaling that indicates a transmission time interval (TTI) bundling configuration. For example, the signaling may direct the wireless communication device 102 to apply TTI bundling in accordance with a particular configuration. The signaling may be received from the base station 118. The signaling may include semi-static (e.g., layer 3) signaling, explicit signaling, implicit signaling, power limitation conditions and/or other signaling.

The wireless communication device 102 may receive 204 signaling that indicates an uplink grant. For example, the wireless communication device 102 may receive 204 signaling that indicates a schedule for transmitting uplink information (to a base station 118, for instance).

The wireless communication device 102 may determine 206 at least one TTI bundling parameter based on the TTI bundling configuration and the uplink grant. For example, the wireless communication device 102 may determine one or more pieces of information (e.g., TTI bundling parameters) relevant to TTI bundling. TTI bundling parameters may include whether TTI bundling is enabled, a TTI bundling size, a TBS determination scheme, a TBS, an RV determination scheme, an RV, one or more subframes for UL-SCH transmissions (for TTI bundling), one or more UL-HARQ processes (for TTI bundling), whether TTI bundling is enabled for MIMO transmissions, whether to multiplex CSI, which CSI to multiplex and/or other parameters described below.

In one configuration, determining 206 the at least one TTI bundling parameter may include determining 206 a subset of subframes for uplink shared channel (UL-SCH) transmissions. In another configuration, determining 206 the at least one TTI bundling parameter may include determining 206 one or more uplink hybrid automatic repeat request (UL-HARQ) processes for uplink shared channel (UL-SCH) transmissions. For example, TTI bundling may be enabled for a certain subset of UL subframes and/or UL-HARQ processes and not enabled for other subsets of UL subframes and/or UL-HARQ processes. Additional TTI bundling parameters are discussed in more detail in the discussion that follows below.

The wireless communication device 102 may transmit 208 a signal based on the at least one TTI bundling parameter. For example, the wireless communication device 102 may transmit 208 information (e.g., data) in a TTI bundle in accordance with the one or more TTI bundling parameters determined 206 by the wireless communication device 102. In one configuration, the wireless communication device may transmit 208 the signal to the base station 118.

Figure 3:
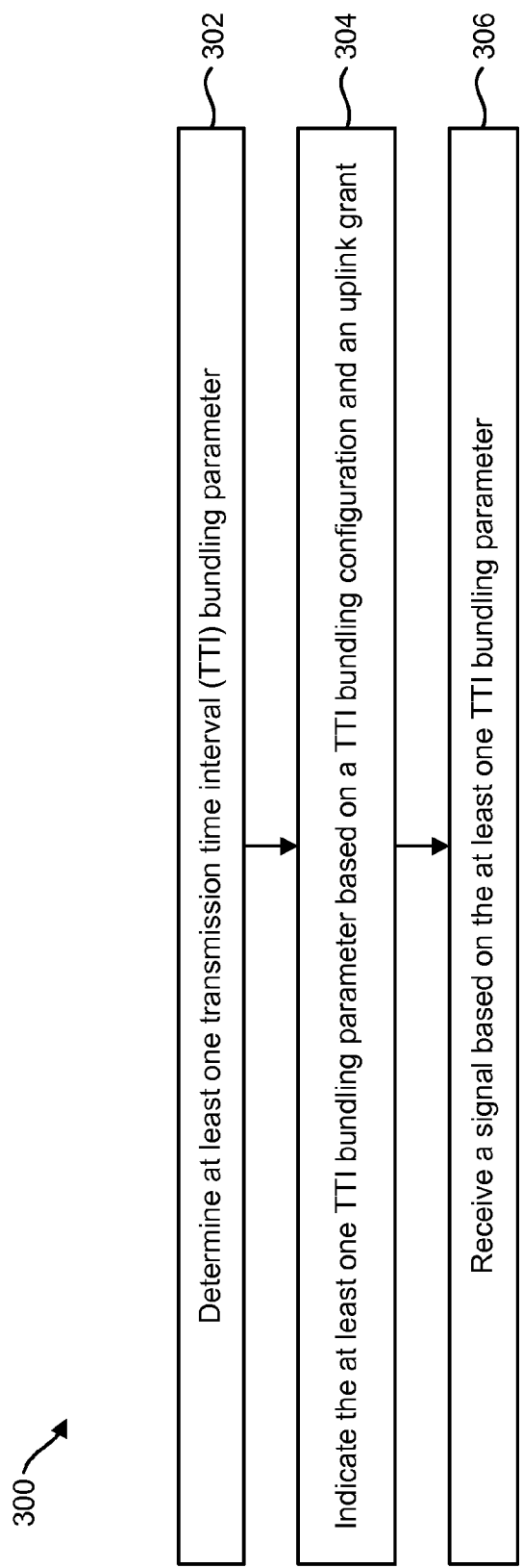
FIG. 3 is a flow diagram illustrating one configuration of a method for determining transmission time interval (TTI) bundling parameters on a base station.

FIG. 3 is a flow diagram illustrating one configuration of a method 300 for determining transmission time interval (TTI) bundling parameters on a base station 118. A base station 118 may determine 302 at least one TTI bundling parameter, which may be used to perform TTI bundling between the base station 118 and the wireless communication device 102. Some examples of the TTI bundling parameters the may be determined (e.g., configured) by the base station 118 include whether TTI bundling is enabled, a TBS determination scheme, a TBS, an RV determination scheme, an RV, one or more subframes for UL-SCH transmissions (for TTI bundling), one or more UL-HARQ processes (for TTI bundling), whether TTI bundling is enabled for MIMO transmissions, whether to multiplex CSI, which CSI to multiplex and/or other TTI bundling parameters described below.

The base station 118 may indicate 304 the at least one TTI bundling parameter based on a TTI bundling configuration and an uplink grant. The TTI bundling configuration may be signaled by semi-static (e.g., layer 3) signaling, explicit signaling, implicit signaling, power limitation conditions and/or other signaling as described below. The TTI bundling configuration signaling may direct the wireless communication device 102 to apply TTI bundling in accordance with a particular configuration.

Furthermore, the base station 118 may indicate 304 a TTI bundling parameter with an uplink grant with signaling that specifies a schedule for transmitting uplink information (to the wireless communication device 102, for instance). For example, in one configuration, the wireless communication device 102 may determine a transport block size (TBS) determination scheme based, in part, on the MCS index ($n_{MCS}$), the number of assigned resource blocks (RBs) for the subframe ($n_{RB\_subframe}$) and the TTI bundling size ($N_{bundle}$) included in the uplink grant sent from the base station 118.

A specific example of a TTI parameter that may be determined 302 by the base station 118 and indicated 304 to the wireless communication device 102 is a transport block size (TBS) determination scheme, as described below in connection with FIG. 4. Another example of a TTI parameter that may be determined 302 by the base station 118 and indicated 304 to the wireless communication device 102 is a redundancy version (RV) determination scheme, as described below in connection with FIG. 5. Yet another example of a TTI parameter that may be determined 302 by the base station 118 and indicated 304 to the wireless communication device 102 is whether TTI bundling is enabled for uplink multiple-input multiple-output (MIMO) transmissions, as described below in connection with FIG. 6.

The base station 118 may indicate 304 one or more TTI parameters to the wireless communication device 102 based on a PUSCH rank, as described below in connection with FIG. 7. The base station 118 may indicate 304 one or more TTI parameters to the wireless communication device 102 based on whether TTI bundling is enabled for UL-MIMO downlink control information (DCI) format 4 initiated rank-1 PUSCH transmissions, as described below in connection with FIG. 8. The base station 118 may also indicate 304 whether to multiplex channel state information (CSI) with uplink shared channel (UL-SCH) information in a TTI bundling, as described below in connection with FIG. 9.

The base station 118 may receive 306 a signal based on at least one TTI bundling parameter. For example, the base station 118 may receive 306 a TTI bundling transmission from the wireless communication device 102 according to one or more TTI bundling parameters indicated 304 by the base station 118.

Figure 4:
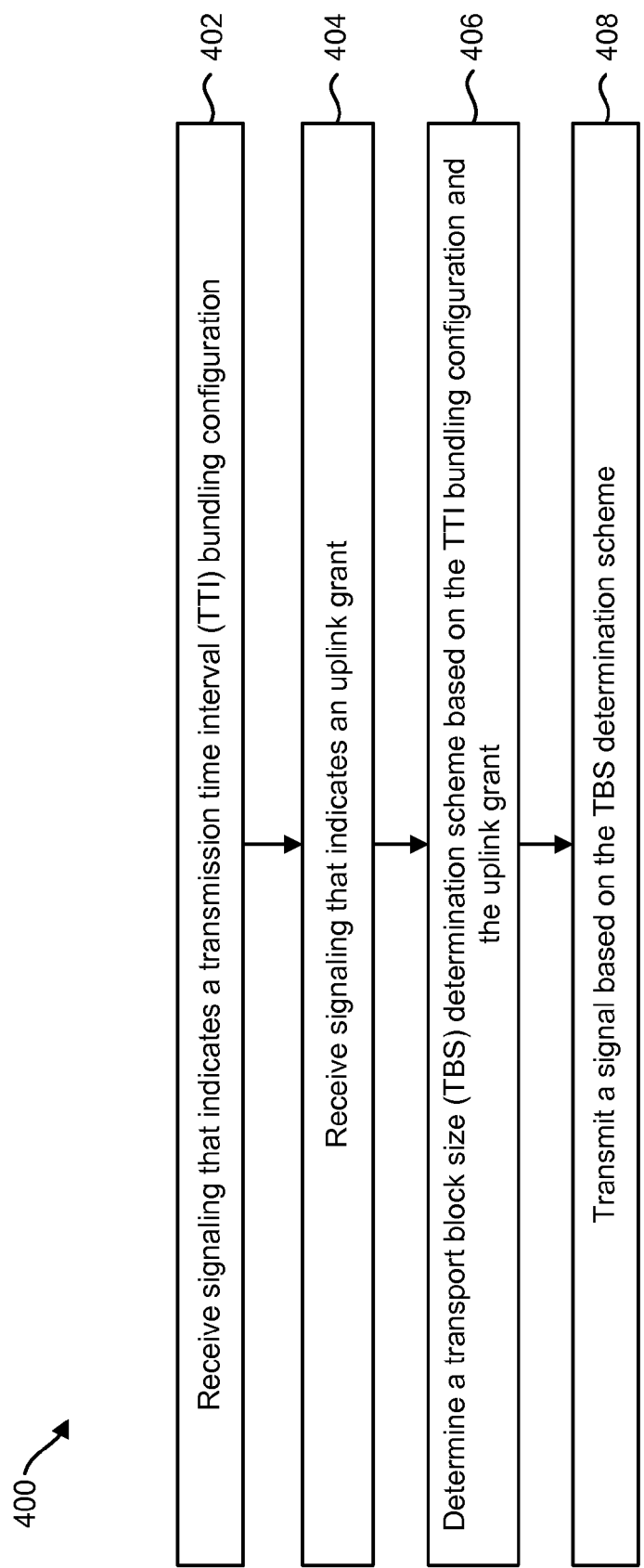
FIG. 4 is a flow diagram illustrating one configuration of a method for determining a transport block size (TBS) determination scheme on a wireless communication device.

FIG. 4 is a flow diagram illustrating one configuration of a method 400 for determining a transport block size (TBS) determination scheme on a wireless communication device 102. A wireless communication device 102 may receive 402 signaling that indicates a transmission time interval (TTI) bundling configuration. This may be accomplished as described above in connection with FIG. 2.

The wireless communication device 102 may receive 404 signaling that indicates an uplink grant. This may be accomplished as described above in connection with FIG. 2. For example, the wireless communication device 102 may receive 402 the signals that indicate the TTI bundling configuration and the uplink grant from a base station 118.

The wireless communication device 102 may determine 406 a transport block size (TBS) determination scheme based on the TTI bundling configuration and the uplink grant. It should be noted that TTI bundling may be useful for both low rate delay sensitive (e.g., VoIP) applications and medium rate (e.g., 384 kilobits per second (kbps)) applications. However, these two application types have different needs for how a PUSCH transmission should be managed. In particular, power control is typically more suitable for VoIP type of applications. Furthermore, rate control is typically more suitable for medium rate applications. Therefore, it may be necessary to support two (or more) types of TBS determination schemes when TTI bundling is enabled.

In an alternative-A, the TBS determination scheme may be based on the MCS index ($n_{MCS}$) and the number of assigned resource blocks (RBs) for the subframe ($n_{RB\_subframe}$). Therefore, under alternative-A, the TBS may be determined as shown in Equation (2) above. In an alternative-B, the TBS determination scheme may be based on the MCS index ($n_{MCS}$) the number of assigned resource blocks (RBs) for the subframe ($n_{RB\_subframe}$) and the TTI bundling size ($N_{bundle}$) as shown in Equation (4):

$$\text{TBS\_ttibundling} = f(n_{MCS}, n_{RB\_subframe}, N_{bundle}). \quad (4)$$

One example of a TBS determination scheme in accordance with alternative-B is $\text{TBS\_ttibundling} = f(n_{MCS}, n_{RB\_subframe} * N_{bundle}/4)$. In this example, if the TTI bundling size is 8, the TBS is determined based on $n_{MCS}$ and $2*n_{RB\_subframe}$.

A wireless communication device 102 may determine 406 the TBS determination scheme for a PUSCH transmission based on signaling. In a first configuration, the wireless communication device 102 may determine 406 the TBS determination scheme based on semi-static (e.g., layer 3) signaling. For example, a wireless communication device 102 may be semi-statically configured for one TBS determination scheme.

In a second configuration, the wireless communication device 102 may determine 406 the TBS determination scheme based on dynamic signaling. For example, a wireless communication device 102 may be configured semi-statically (or by specification) for two or more TBS determination schemes and dynamic signaling may indicate which scheme is in use for a particular PUSCH transmission. Semi-static signaling may configure the alternative-A TBS determination scheme and the alternative-B TBS determination scheme as described above. Dynamic signaling may then indicate whether the wireless communication device 102 should use the alternative-A TBS determination scheme or the alternative-B TBS determination scheme for a particular PUSCH transmission.

In a third configuration, the wireless communication device 102 may determine 406 the TBS determination scheme based on implicit signaling (e.g., implicit derivation). For example, a wireless communication device 102 may be configured semi-statically (or by specification) for two or more TBS determination schemes, and the TBS determination scheme in use for a PUSCH may be associated with one or more other parameters. In some configurations, the parameters that may be used for implicit signaling may include whether the PUSCH is semi-persistently scheduled (SPS) or not, a subframe index, a HARQ process identity (ID), a DCI format, control decoding candidates, whether single-input multiple-output (SIMO) or multiple-input multiple-output (MIMO) is used, etc.

In one example, the wireless communication device 102 is semi-statically configured with two TBS determination schemes: the alternative-A TBS determination scheme and the alternative-B TBS determination scheme as described above. A linkage may be based on whether the PUSCH is SPS or not. If the PUSCH is SPS, then alternative-A may be applied for SPS UL traffic. If the PUSCH is not SPS, then alternative-B may be applied for non-SPS UL traffic. The linkage additionally or alternatively may be based on subframe indices and/or HARQ process IDs. For instance, alternative-A may be applied for HARQ process 0 and alternative-B may be applied for HARQ process 1.

The wireless communication device 102 may transmit 408 a signal based on the TBS determination scheme. For example, the wireless communication device 102 may transmit 408 information (e.g., data) in a TTI bundle in accordance with the TBS determination scheme determined 406 by the wireless communication device 102. In one configuration, the wireless communication device may transmit 408 the signal to the base station 118.

Figure 5:
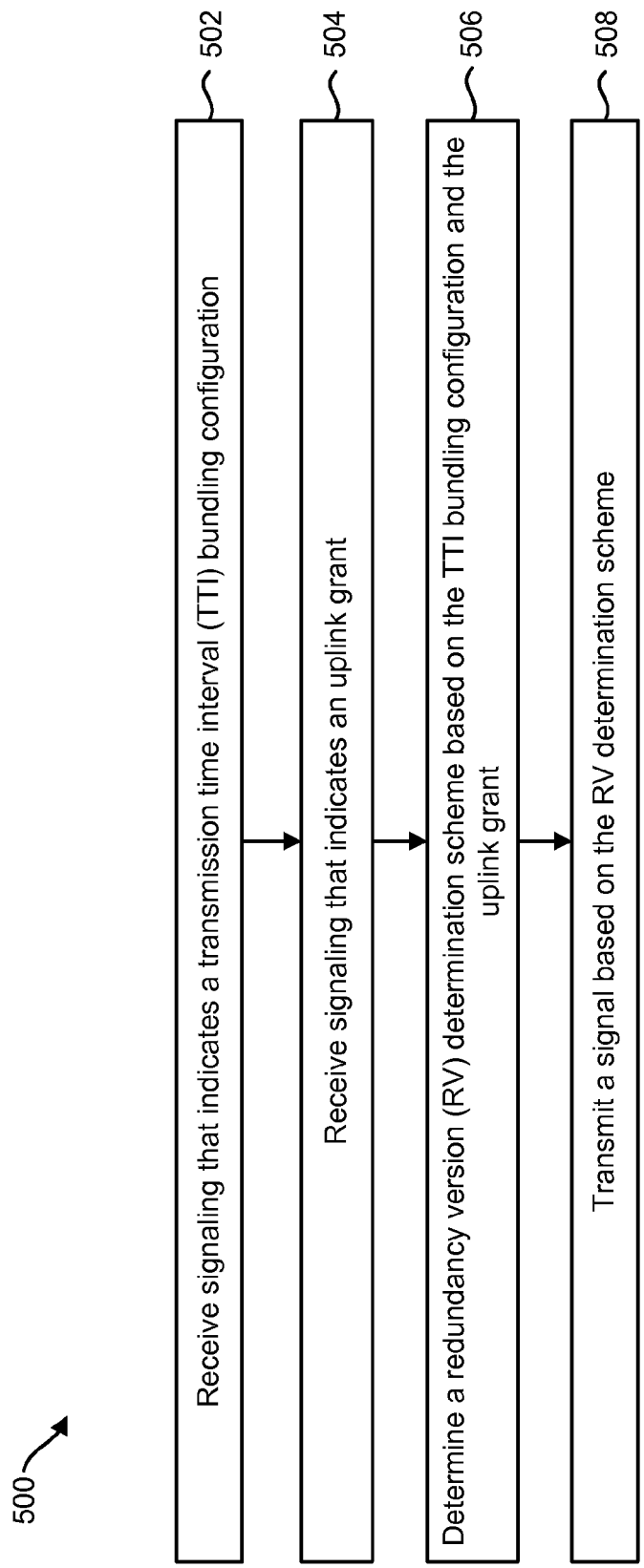
FIG. 5 is a flow diagram illustrating one configuration of a method for determining a redundancy version (RV) determination scheme on a wireless communication device.

FIG. 5 is a flow diagram illustrating one configuration of a method 500 for determining a redundancy version (RV) determination scheme on a wireless communication device 102. A wireless communication device 102 may receive 502 signaling that indicates a transmission time interval (TTI)

bundling configuration. This may be accomplished as described above in connection with FIG. 2.

The wireless communication device 102 may receive 504 signaling that indicates an uplink grant. This may also be accomplished as described above in connection with FIG. 2. For example, the wireless communication device 102 may receive 402 the signals that indicate the TTI bundling configuration and the uplink grant from a base station 118.

The wireless communication device 102 may determine 506 a redundancy version (RV) determination scheme based on the TTI bundling configuration and the uplink grant. In some configurations, an RV determination scheme may depend on how the TBS is determined. For example, if the TBS determination scheme is the same as a non-TTI bundling case, then the current RV determination scheme may be applied. In one configuration, for a TTI bundling size of 8, the following RV order may be applied: 0, 2, 3, 1, 0, 2, 3, 1. However, if the TBS determination scheme is further based on the TTI bundling size, the coding rate in one TTI may be larger than 1. In such a case, the RV order of 0, 2, 3, 1 may no longer be the best.

Other RV determination schemes may be implemented. In one configuration, the RV determination scheme may include transmitting RV 0 (systematic bits) in the first two or more consecutive subframes such that the wireless communication device 102 can receive the entire systematic bits first.

In a second configuration, the RV determination scheme may be based on two or more consecutive subframes when determining the number of available resources for one RV. In this configuration, an individual RV may be mapped to the two or more subframes. For example, for a TTI bundling size of 8 and alternative-B of the TBS determination scheme described above, the following RV order may be applied: {0, 0'}, {2, 2'}, {3, 3'}, {1, 1'}. In this example, the resource mapping for a PUSCH for each RV is done jointly for the two adjacent subframes. Furthermore, {0, 0'} stands for the fact that the original RV 0 is mapped to two adjacent subframes of the same TTI bundling. As used herein, the term "adjacent" may not necessarily mean that two subframes are consecutive in time. For example, a TTI bundle may include 8 subframes, where these 8 subframes may be subframes 0, 2, 4, 6, 8, 10, 12 and 14. That is, the TTI bundle may be interleaved with one or more subframes, for example. A wireless communication device 102 may be informed whether the TTI bundle is consecutive or non-consecutive (e.g., interleaved). Therefore, a TTI bundling parameter may include determining whether the subframes in a TTI bundling are consecutive or non-consecutive. A wireless communication device 102 may also be informed of the TTI bundling size.

In a third configuration, the RV determination scheme may be based on eight RV values. For example, the eight RV values may be defined from 0-7. The RV may be determined in the order of {0, 1, 4, 5, 6, 7, 2, 3}.

The RV determination scheme may or may not be based on the TBS determination scheme. In one configuration, the RV determination scheme may be signaled separately from the TBS determination scheme. For example, the RV determination scheme may be signaled using similar approaches described above for the TBS determination scheme (e.g., semi-static, dynamic and/or implicit signaling). In another configuration, the RV determination scheme may be implicitly derived based on the TBS determination scheme applied. For example, if a TBS determination scheme for an UL-SCH is based on the alternative-A described above, the RV order of 0, 2, 3, 1 may be applied. However, if the TBS determination scheme for an UL-SCH is based on the alternative-B described above, the RV order of {0, 0'}, {2, 2'}, {3, 3'}, {1, 1'} may be applied.

The wireless communication device 102 may transmit 508 a signal based on the RV determination scheme. For example, the wireless communication device 102 may transmit 508 information (e.g., data) in a TTI bundle in accordance with the RV determination scheme determined 506 by the wireless communication device 102. In one configuration, the wireless communication device may transmit 508 the signal to the base station 118.

Figure 6:
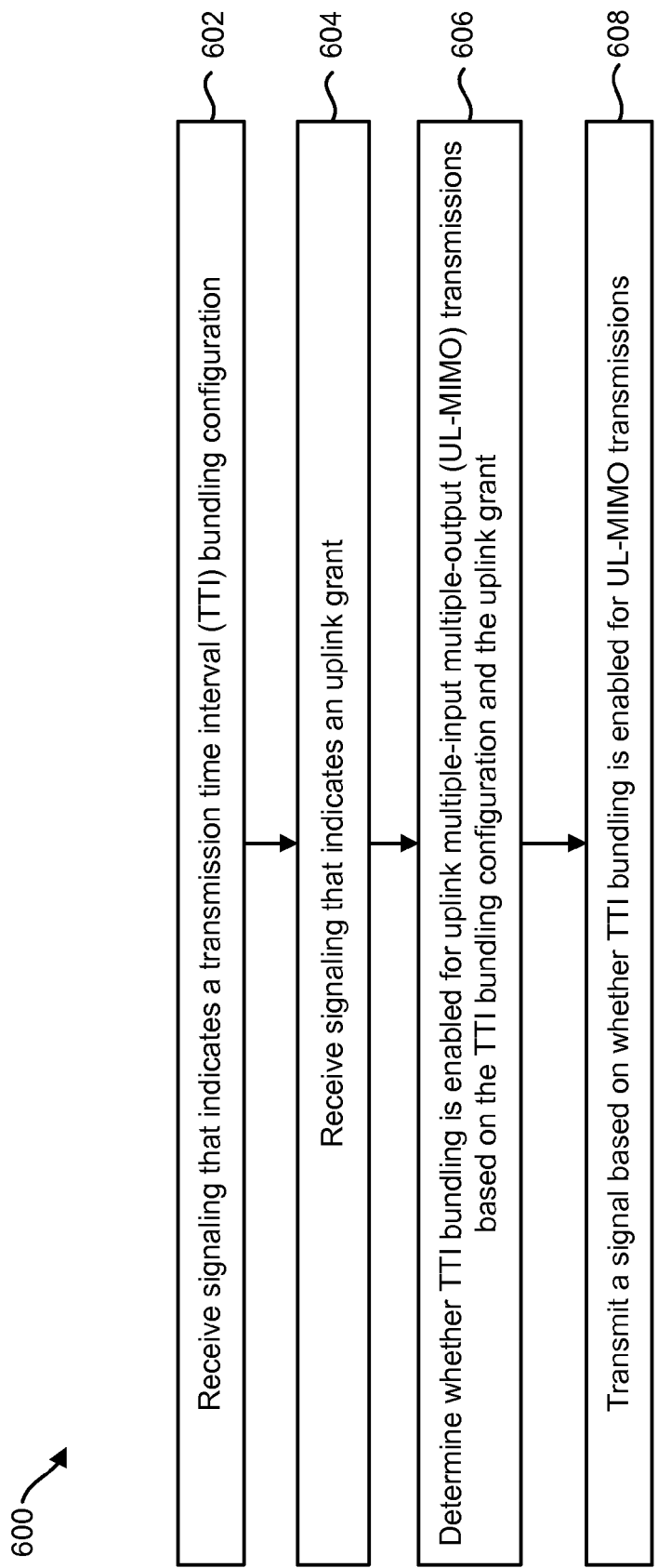
FIG. 6 is a flow diagram illustrating one configuration of a method for determining whether TTI bundling is enabled for uplink multiple-input multiple-output (MIMO) transmissions on a wireless communication device.

FIG. 6 is a flow diagram illustrating one configuration of a method 600 for determining whether TTI bundling is enabled for uplink multiple-input multiple-output (MIMO) transmissions on a wireless communication device 102. A wireless communication device 102 may receive 602 signaling that indicates a transmission time interval (TTI) bundling configuration. This may be accomplished as described above in connection with FIG. 2.

The wireless communication device 102 may receive 604 signaling that indicates an uplink grant. This may also be accomplished as described above in connection with FIG. 2. For example, the wireless communication device 102 may receive 402 the signals that indicate the TTI bundling configuration and the uplink grant from a base station 118.

The wireless communication device 102 may determine 606 whether TTI bundling is enabled for uplink multiple-input multiple-output (MIMO) transmissions based on the TTI bundling configuration and the uplink grant. TTI bundling may be enabled for an UL-MIMO operation. For example, UL-MIMO (e.g., rank 2 or higher) can be supported for TTI bundling and TTI bundling may be applicable to both transport blocks (TBs).

The wireless communication device may determine 606 a TTI bundling size based on whether TTI bundling is enabled for UL-MIMO transmissions. The TTI bundling size for rank-1 and greater than rank-1 operation may be different. For example, for UL-SIMO, TTI bundling may be helpful for both low rate and medium rate applications. For UL-MIMO, however, TTI bundling may be mainly helpful for medium rate applications. Therefore, TTI bundling sizes of {4, 8} may be applied for rank- 1 PUSCH, while a TTI bundling size of 4 only may be applied for a PUSCH that is greater than rank-1.

Similarly, the wireless communication device may determine 606 at least one of a transport block size (TBS) determination scheme and a redundancy version (RV) determination scheme based on whether TTI bundling is enabled for UL-MIMO transmissions. The TBS determination schemes and RV determination schemes for rank-1 and greater than rank-1 operation may be different. For example, the alternative-A TBS determination scheme (discussed above) and {0, 2, 3, 1} RV order may be applied for rank-1 PUSCH, while the alternative-B TBS determination scheme (discussed above) and {0, 0', 2, 2', 3, 3', 1, 1'} RV order may be applied for a PUSCH that is greater than rank-1. It should be noted, however, that it may generally be not preferable to have UL-MIMO with TTI bundling.

The wireless communication device 102 may transmit 608 a signal based on whether TTI bundling is enabled for UL-MIMO transmissions. For example, the wireless communication device 102 may transmit 608 information (e.g., data) in a TTI bundle in accordance with the TBS determination scheme determined 606 by the wireless communication device 102. In one configuration, the wireless communication device may transmit 608 the signal to the base station 118.

Figure 7:
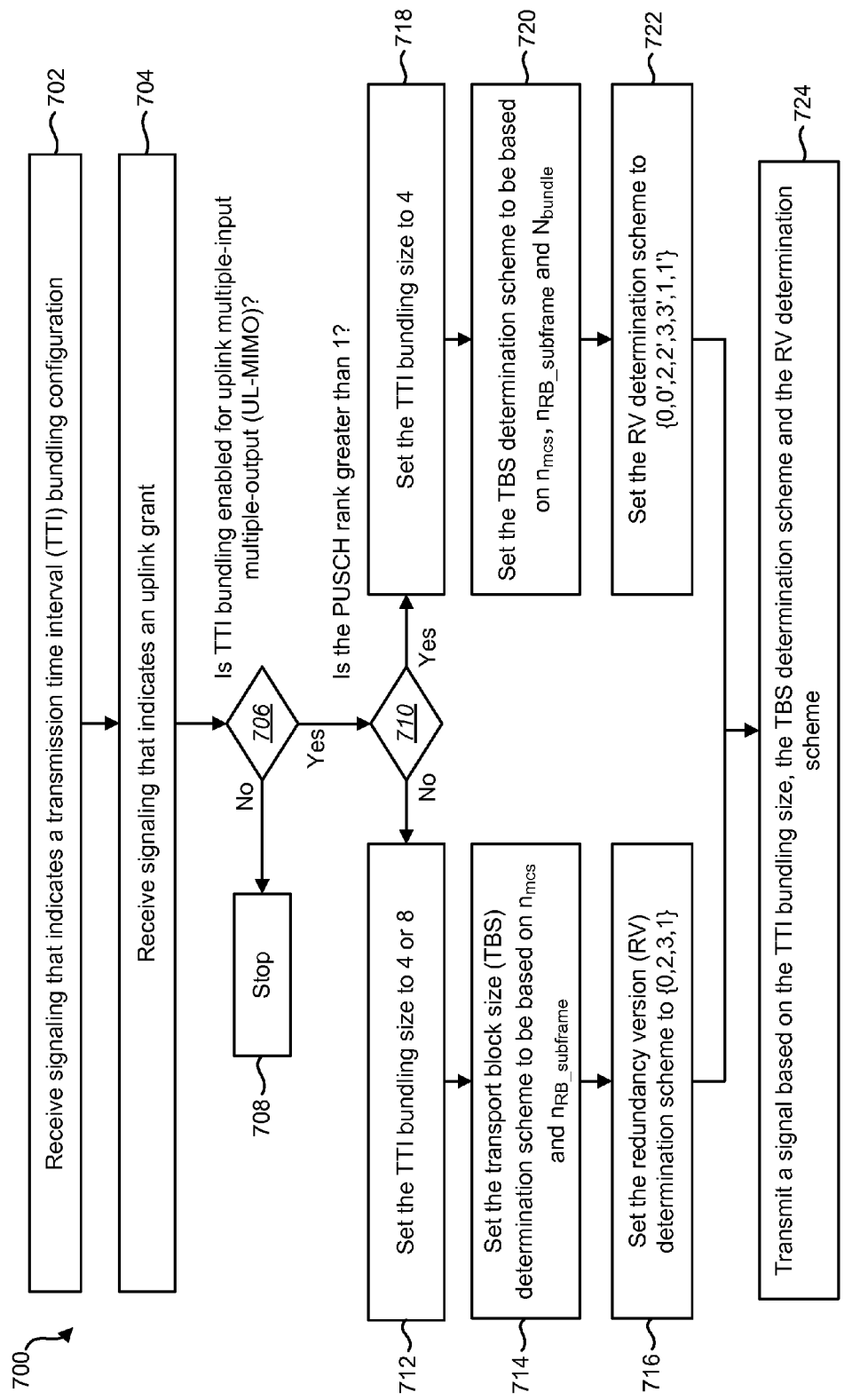
FIG. 7 is a flow diagram illustrating one configuration of a method for determining a TTI bundling size, a TBS determination scheme and an RV determination scheme based on a physical uplink shared channel (PUSCH) rank.

FIG. 7 is a flow diagram illustrating one configuration of a method 700 for determining a TTI bundling size, a TBS determination scheme and an RV determination scheme based on a PUSCH rank. A wireless communication device 102 may receive 702 signaling that indicates a transmission time interval (TTI) bundling configuration. This may be accomplished as described above in connection with FIG. 2.

The wireless communication device 102 may receive 704 signaling that indicates an uplink grant. This may also be accomplished as described above in connection with FIG. 2. For example, the wireless communication device 102 may receive 402 the signals that indicate the TTI bundling configuration and the uplink grant from a base station 118.

The wireless communication device 102 may determine 706 whether TTI bundling is enabled for uplink multiple-input multiple-output (MIMO) transmissions based on the TTI bundling configuration and the uplink grant. This may be accomplished as described above in connection with FIG. 6. If TTI bundling is not enabled for UL-MIMO transmissions, then the wireless communication device 102 may stop 708 TTI bundling for UL-MIMO transmissions.

If the wireless communication device 102 determines 706 that TTI bundling is enabled for UL-MIMO transmissions, then the wireless communication device 102 may determine 710 whether the PUSCH rank is greater than 1. If the PUSCH rank is not greater than 1 (e.g., a rank-1 PUSCH), then the wireless communication device 102 may set 712 the TTI bundling size to 4 or 8. The wireless communication device 102 may also set 714 the TBS determination scheme to be based on the MCS index ($n_{MCS}$) and the number of assigned resource blocks (RBs) for the subframe ($n_{RB\_subframe}$). The wireless communication device 102 may further set 716 the RV determination scheme to {0, 2, 3, 1}.

If the wireless communication device 102 determines 710 that the PUSCH rank is greater than 1 (e.g., a rank-2 PUSCH), then the wireless communication device 102 may set 718 the TTI bundling size to 4. The wireless communication device 102 may also set 720 the TBS determination scheme to be based on the MCS index ($n_{MCS}$) the number of assigned resource blocks (RBs) for the subframe ($n_{RB\_subframe}$) and the TTI bundling size ($N_{bundle}$). The wireless communication device 102 may further set 716 the RV determination scheme to {0, 0', 2, 2', 3, 3', 1, 1'}.

The wireless communication device 102 may transmit 724 a signal based on the TTI bundling size, the TBS determination scheme and the RV determination scheme. Therefore, the TTI bundling size, the TBS determination scheme and the RV determination scheme used to transmit 724 the signal may be different for rank-1 operation and greater than rank-1 operation. In one configuration, the wireless communication device may transmit 724 the signal to the base station 118.

Figure 8:
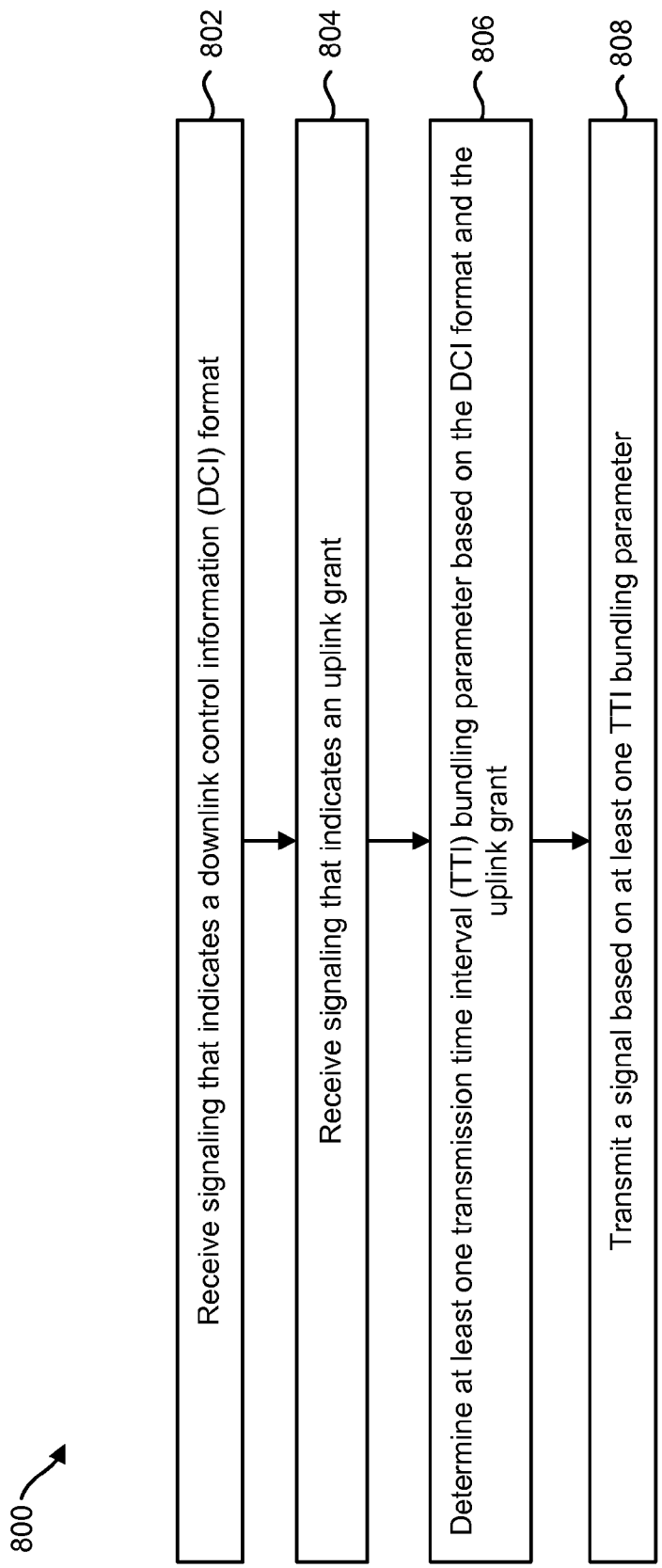
FIG. 8 is a flow diagram illustrating one configuration of a method for determining at least one TTI bundling parameter based on whether TTI bundling is enabled for UL-MIMO downlink control information (DCI) format 4 initiated rank-1 PUSCH transmissions.

FIG. 8 is a flow diagram illustrating one configuration of a method 800 for determining at least one TTI bundling parameter based on whether TTI bundling is enabled for UL-MIMO downlink control information (DCI) format 4 initiated rank-1 PUSCH transmissions. A wireless communication device 102 may receive 802 signaling that indicates a DCI format. The DCI format may be either DCI format 0 or DCI format 4.

The wireless communication device 102 may receive 804 signaling that indicates an uplink grant. This may be accomplished as described above in connection with FIG. 2. For example, the wireless communication device 102 may receive 402 the signals that indicate the TTI bundling configuration and the uplink grant from a base station 118.

The wireless communication device 102 may determine 806 at least one TTI bundling parameter based on the DCI format and the uplink grant. TTI bundling may be enabled for UL-MIMO DCI format 4 initiated rank-1 PUSCH transmissions. The wireless communication device 102 may determine 806 whether TTI bundling is enabled for rank-1 UL-MIMO transmissions based on an UL-MIMO downlink control information (DCI) format 4. UL-MIMO DCI format 4 initiated rank-1 PUSCH transmissions may be enabled to exploit UL beamforming. The same beamforming vector may be applied to all the subframes involved in TTI bundling. Alternatively, the beamforming vector may follow a predefined pattern (e.g., beamforming cycling).

In one configuration, if DCI format 4 is also applied to activate UL SPS, the beamforming vector in the activation may also be applied for all SPS transmissions without a PDCCH. In another configuration, the beamforming vector following the latest beamforming vector in a PDCCH may be applied for all PUSCH transmissions without PDCCH. In yet another configuration, a beamforming vector following a fixed beamforming vector may be applied for all PUSCH transmissions without PDCCH. In yet another configuration, a beamforming vector may be applied by the wireless communication device 102 implementation for all PUSCH transmissions without PDCCH.

Determining 806 the at least one TTI bundling parameter may also include determining 806 a TTI bundling size, a transport block size (TBS) determination scheme and a redundancy version (RV) determination scheme based on a DCI format 0 or a DCI format 4. The TTI bundling size may be different for DCI format 0 operation and DCI format 4 operation. Similarly, the TBS determination schemes and the RV determination schemes may be different for DCI format 0 operation and DCI format 4 operation.

The wireless communication device 102 may transmit 808 a signal based on at least one TTI bundling parameter. For example, the wireless communication device 102 may transmit 808 information (e.g., data) in a TTI bundle in accordance with the TTI bundling size, the transport block size (TBS) determination scheme and the redundancy version (RV) determination scheme determined 806 by the wireless communication device 102. In one configuration, the wireless communication device may transmit 808 the signal to the base station 118.

Figure 9:
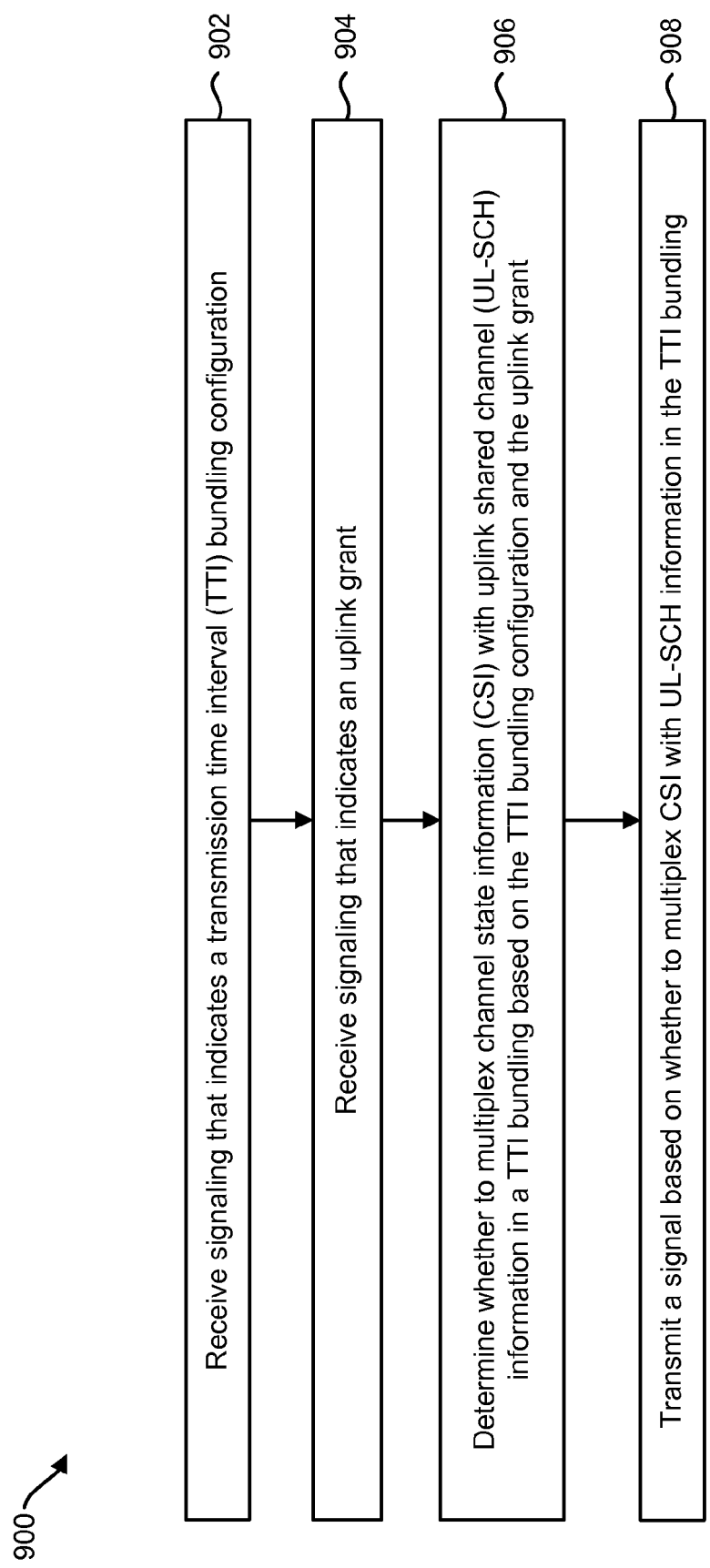
FIG. 9 is a flow diagram illustrating one configuration of a method for determining whether to multiplex channel state information (CSI) with uplink shared channel (UL-SCH) information in a TTI bundling.

FIG. 9 is a flow diagram illustrating one configuration of a method 900 for determining whether to multiplex channel state information (CSI) with uplink shared channel (UL-SCH) information in a TTI bundling. A wireless communication device 102 may receive 902 signaling that indicates a transmission time interval (TTI) bundling configuration. This may be accomplished as described above in connection with FIG. 2.

The wireless communication device 102 may receive 904 signaling that indicates an uplink grant. This may be accomplished as described above in connection with FIG. 2. For example, the wireless communication device 102 may receive 402 the signals that indicate the TTI bundling configuration and the uplink grant from a base station 118.

The wireless communication device 102 may determine 906 whether to multiplex channel state information (CSI) with uplink shared channel (UL-SCH) information in a TTI bundling based on the TTI bundling configuration and the uplink grant. In Rel-8/9/10, when UL-SCH information in a TTI bundling collides with periodic channel state information (P-CSI), the P-CSI is dropped. In accordance with the systems and methods disclosed herein, however, the wireless communication device 102 may multiplex uplink control information (UCI) (e.g., P-CSI) and UL-SCH information together in the same PUSCH. In particular, when TTI bundling for medium rate applications is configured, multiplexing UCI and UL-SCH information together in the same PUSCH may be beneficial.

The wireless communication device 102 may determine 906 whether to multiplex channel state information (CSI) based on explicit or implicit signaling. For example, a wireless communication device 102 may be informed explicitly or implicitly whether to multiplex P-CSI with UL-SCH information in a TTI bundling. In one configuration, if the TBS determination scheme is based on alternative-B described above, then P-CSI may be multiplexed with UL-SCH information. However, if the TBS determination scheme is based on alternative-A described above, P-CSI may be dropped.

P-CSI may be selectively multiplexed or dropped based on a type. For example, a rank indicator (RI), precoding type indicator (PTI) and precoding matrix indicator (PMI) may be multiplexed, but not a channel quality indicator (CQI). In the known approach, PMI and CQI for P-CSI are always transmitted in one report. However, in accordance with the systems and methods disclosed herein, PMI may be transmitted and CQI dropped when multiplexing on a PUSCH with a TTI bundling, where the reported PMI would facilitate UL beamforming operation.

Whether or not to multiplex CSI with UL-SCH information in a TTI bundling may additionally or alternatively depend on wireless communication device 102 power limitation conditions. For example, if there is no power limitation, multiplexing of UCI on a PUSCH with a TTI bundling may be applied. However, if a wireless communication device 102 is already power limited, then no multiplexing of UCI on a PUSCH with a TTI bundling may be applied.

Piggybacking of UCI on a PUSCH may be performed. In one configuration, Piggybacking of UCI onto a PUSCH for a single subframe may be performed. For example, a TTI bundling size may be 4. In subframe n, P-CSI and UL-SCH information may be included. However, subframes n+1, n+2 and n+3 may include only UL-SCH information. In another configuration, TTI bundling for UCI may be allowed. For example, a TTI bundling size may be 8. In subframes n and n+1, P-CSI and UL-SCH information may be included. In subframes n+2, n+3, n+4, n+5, n+6 and n+7, however, only UL-SCH information may be included.

An ACK/NAK repetition transmission may be multiplexed onto a PUSCH with TTI bundling. UL ACK/NAK repetition may be configured for a wireless communication device 102 (with a repetition factor of 2, 4, 6, for example). In a known approach, if UL ACK/NAK repetition is configured for a wireless communication device 102, and if the ACK/NAK transmission collides with any UL signals, the UL signals will be dropped. In accordance with the systems and methods disclosed herein, however, an ACK/NAK transmission (under repetition) may be multiplexed onto a PUSCH with a TTI bundling. For example, an ACK/NAK repetition transmission with a repetition factor of 4 may occur in subframe n, n+1, n+2 and n+3, and a PUSCH TTI bundling transmission may occur in subframes n+2, n+3, n+4 and n+5. Either the PUSCH TTI bundling transmission in subframes n+2 and n+3 may be dropped (in accordance with current specifications, for example) or ACK/NAK may be multiplexed onto a PUSCH in subframes n+2 and n+3 (in accordance with the systems and methods disclosed herein, for example). The transmission of an ACK/NAK repetition may also be aligned with a PUSCH TTI bundling to ensure a complete overlap as much as possible. For example, both the ACK/NAK repetition transmission and the PUSCH TTI bundling transmission may occur in subframes n, n+1, n+2 and n+3.

The wireless communication device 102 may transmit 908 a signal based on whether to multiplex channel state information (CSI) with uplink shared channel (UL-SCH) information in a TTI bundling. For example, the wireless communication device 102 may multiplex P-CSI with UL-SCH information. Additionally or alternatively, an ACK/NAK repetition transmission may be multiplexed onto a PUSCH with a TTI bundling. In one configuration, the wireless communication device may transmit 908 the signal to the base station 118.

Figure 10:
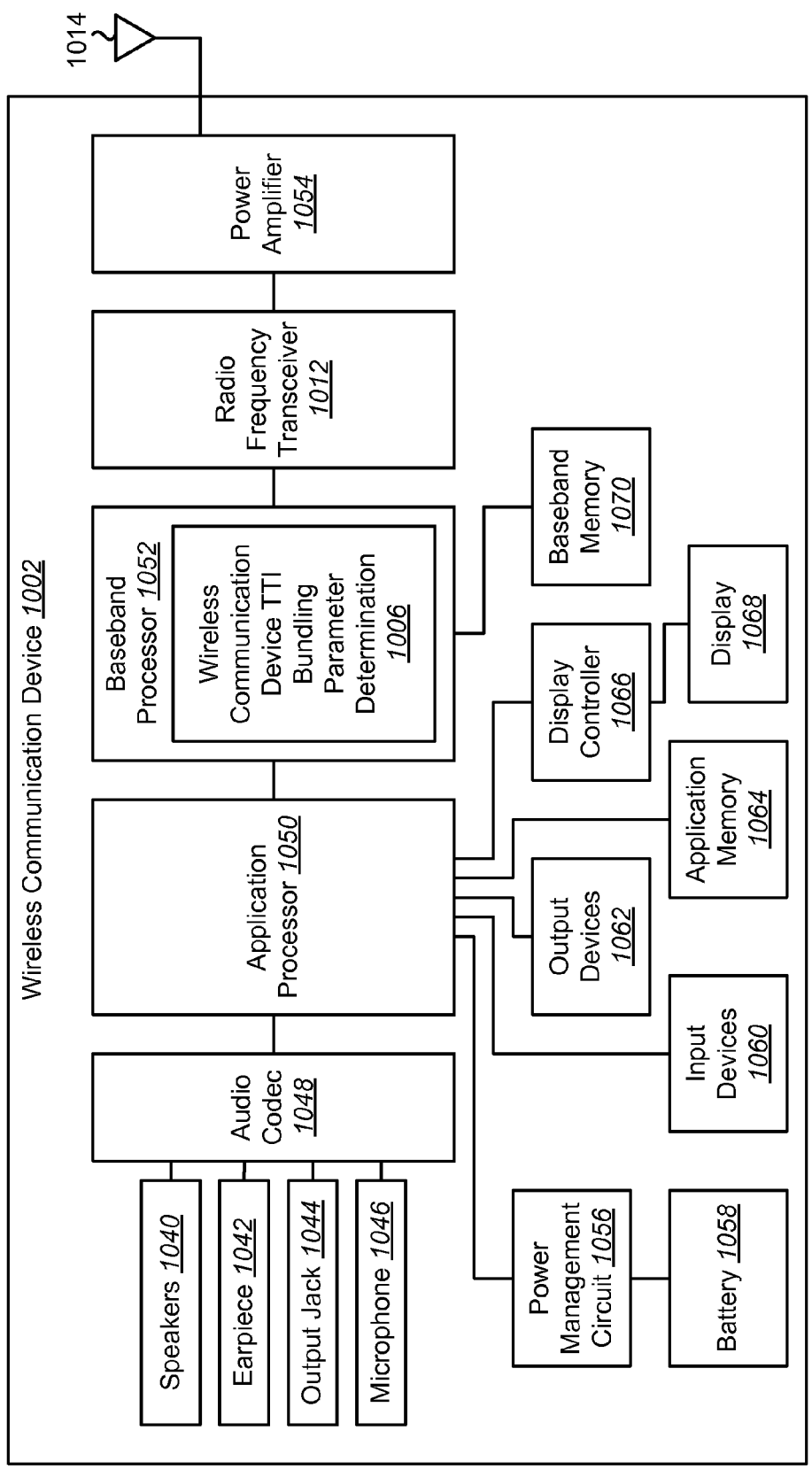
FIG. 10 is a block diagram illustrating one configuration of a wireless communication device in which systems and methods for determining transmission time interval (TTI) bundling parameters may be implemented.

FIG. 10 is a block diagram illustrating one configuration of a wireless communication device 1002 in which systems and methods for determining transmission time interval (TTI) bundling parameters may be implemented. The wireless communication device 1002 may be one example of the wireless communication device 102 described above in connection with FIG. 1. The wireless communication device 1002 may include an application processor 1050. The application processor 1050 generally processes instructions (e.g., runs programs) to perform functions on the wireless communication device 1002. The application processor 1050 may be coupled to an audio coder/decoder (codec) 1048.

The audio codec 1048 may be an electronic device (e.g., integrated circuit) used for coding and/or decoding audio signals. The audio codec 1048 may be coupled to one or more speakers 1040, an earpiece 1042, an output jack 1044 and/or one or more microphones 1046. The speakers 1040 may include one or more electro-acoustic transducers that convert electrical or electronic signals into acoustic signals. For example, the speakers 1040 may be used to play music or output a speakerphone conversation, etc. The earpiece 1042 may be another speaker or electro-acoustic transducer that can be used to output acoustic signals (e.g., speech signals). The output jack 1044 may be used for coupling other devices to the wireless communication device 1002 for outputting audio, such as headphones. The speakers 1040, earpiece 1042 and/or output jack 1044 may generally be used for outputting an audio signal from the audio codec 1048. The one or more microphones 1046 may be one or more acousto-electric transducers that convert an acoustic signal (such as a user's voice) into electrical or electronic signals that are provided to the audio codec 1048.

The application processor 1050 may also be coupled to a power management circuit 1056. One example of the power management circuit 1056 is a power management integrated circuit (PMIC), which may be used to manage the electrical power consumption of the wireless communication device 1002. The power management circuit 1056 may be coupled to a battery 1058. The battery 1058 may generally provide electrical power to the wireless communication device 1002.

The application processor 1050 may be coupled to one or more input devices 1060 for receiving input. Examples of input devices 1060 include infrared sensors, image sensors, accelerometers, touch sensors, keypads, etc. The input devices 1060 may allow user interaction with the wireless communication device 1002. The application processor 1050 may also be coupled to one or more output devices 1062. Examples of output devices 1062 include printers, projectors, screens, haptic devices, etc. The output devices 1062 may allow the wireless communication device 1002 to produce output that may be experienced by a user.

The application processor 1050 may be coupled to application memory 1064. The application memory 1064 may be any electronic device that is capable of storing electronic information. Examples of application memory 1064 include double data rate synchronous dynamic random access memory (DDRAM), synchronous dynamic random access memory (SDRAM), flash memory, etc. The application memory 1064 may provide storage for the application processor 1050. For instance, the application memory 1064 may store data and/or instructions for the functioning of programs that are run on the application processor 1050.

The application processor 1050 may be coupled to a display controller 1066, which in turn may be coupled to a display 1068. The display controller 1066 may be a hardware block that is used to generate images on the display 1068. For example, the display controller 1066 may translate instructions and/or data from the application processor 1050 into images that can be presented on the display 1068. Examples of the display 1068 include liquid crystal display (LCD) panels, light emitting diode (LED) panels, cathode ray tube (CRT) displays, plasma displays, etc.

The application processor 1050 may be coupled to a baseband processor 1052. The baseband processor 1052 generally processes communication signals. For example, the baseband processor 1052 may demodulate and/or decode received signals. Additionally or alternatively, the baseband processor 1052 may encode and/or modulate signals in preparation for transmission.

The baseband processor 1052 may include a wireless communication device TTI bundling parameter determination block/module 1006. The wireless communication device TTI bundling parameter determination block/module 1006 illustrated in FIG. 10 may be one example of the wireless communication device TTI bundling parameter determination block/module 106 illustrated in FIG. 1. The wireless communication device TTI bundling parameter determination block/module 1006 may be configured to perform one or more of the methods 200, 400, 500, 600, 700, 800, 900 described above.

The baseband processor 1052 may be coupled to baseband memory 1070. The baseband memory 1070 may be any electronic device capable of storing electronic information, such as SDRAM, DDRAM, flash memory, etc. The baseband processor 1052 may read information (e.g., instructions and/or data) from and/or write information to the baseband memory 1070. Additionally or alternatively, the baseband processor 1052 may use instructions and/or data stored in the baseband memory 1070 to perform communication operations.

The baseband processor 1052 may be coupled to a radio frequency (RF) transceiver 1012. The RF transceiver 1012 may be coupled to a power amplifier 1054 and one or more antennas 1014. The RF transceiver 1012 may transmit and/or receive radio frequency signals. For example, the RF transceiver 1012 may transmit an RF signal using a power amplifier 1054 and one or more antennas 1014. The RF transceiver 1012 may also receive RF signals using the one or more antennas 1014.

Figure 11:
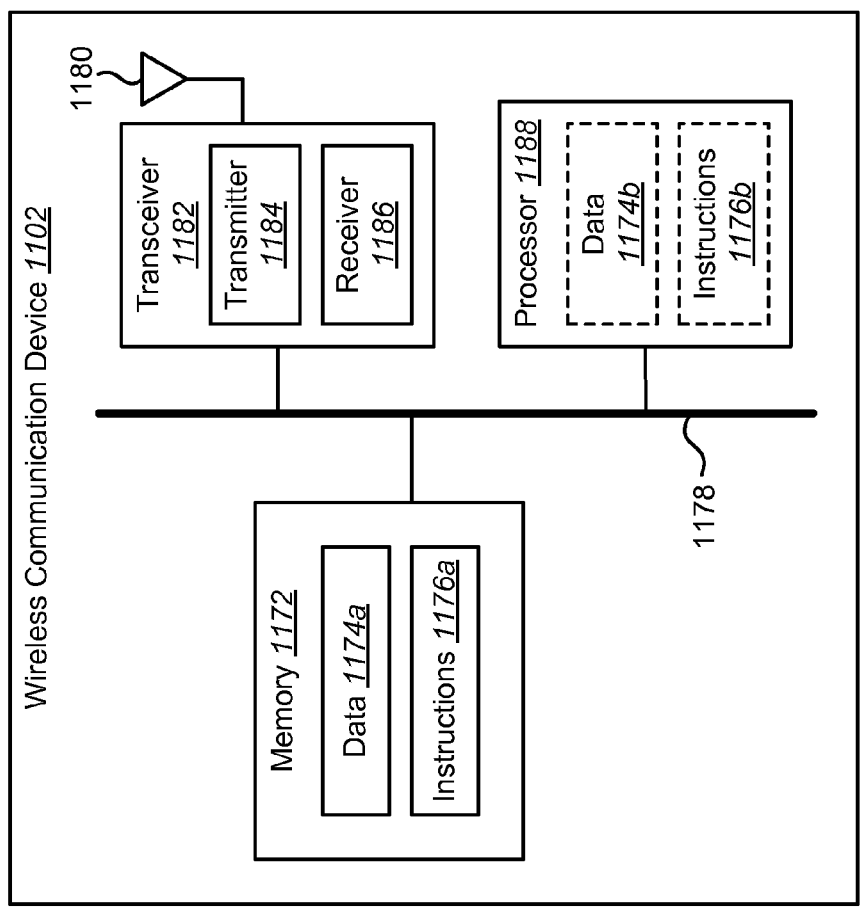
FIG. 11 illustrates certain components that may be included within a wireless communication device.

FIG. 11 illustrates certain components that may be included within a wireless communication device 1102. The wireless communication device 1102 may be implemented in accordance with one or more of the wireless communication devices 102, 1002 described above. The wireless communication device 1102 includes a processor 1188. The processor 1188 may be a general purpose single- or multi-chip microprocessor (e.g., an ARM), a special purpose microprocessor (e.g., a digital signal processor (DSP)), a microcontroller, a programmable gate array, etc. The processor 1188 may be referred to as a central processing unit (CPU). Although just a single processor 1188 is shown in the wireless communication device 1102 of FIG. 11, in an alternative configuration, a combination of processors (e.g., an ARM and DSP) could be used.

The wireless communication device 1102 also includes memory 1172 in electronic communication with the processor 1188 (i.e., the processor 1188 can read information from and/or write information to the memory 1172). The memory 1172 may be any electronic component capable of storing electronic information. The memory 1172 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1174a and instructions 1176a may be stored in the memory 1172. The instructions 1176a may include one or more programs, routines, sub-routines, functions, procedures, etc. The instructions 1176a may include a single computer-readable statement or many computer-readable statements. The instructions 1176a may be executable by the processor 1188 to implement one or more of the methods that were described above. Executing the instructions 1176a may involve the use of the data 1174a that is stored in the memory 1172. FIG. 11 shows some instructions 1176b and data 1174b being loaded into the processor 1188.

The wireless communication device 1102 may also include a transmitter 1184 and a receiver 1186 to allow transmission and reception of signals between the wireless communication device 1102 and a remote location (e.g., a base station or other wireless communication device). The transmitter 1184 and receiver 1186 may be collectively referred to as a transceiver 1182. An antenna 1180 may be electrically coupled to the transceiver 1182. The wireless communication device 1102 may also include (not shown) multiple transmitters, multiple receivers, multiple transceivers and/or multiple antenna.

The various components of the wireless communication device 1102 may be coupled together by one or more buses, which may include a power bus, a control signal bus, a status signal bus, a data bus, etc. For simplicity, the various buses are illustrated in FIG. 11 as a bus system 1178.

Figure 12:
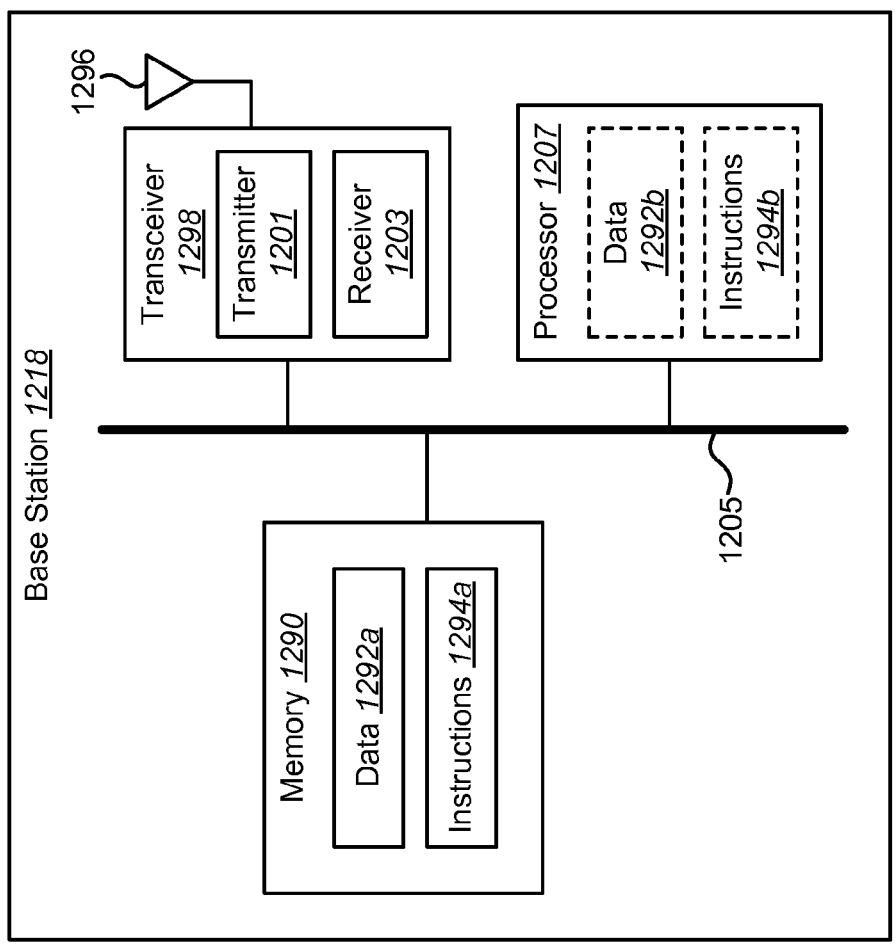
FIG. 12 illustrates certain components that may be included within a base station.

FIG. 12 illustrates certain components that may be included within a base station 1218. The base station 118 described in connection with FIG. 12 may be implemented in accordance with the base station 118 described above in connection with FIG. 1. The base station 1218 includes a processor 1207. The processor 1207 may be a general purpose single- or multi-chip microprocessor (e.g., an ARM), a special purpose microprocessor (e.g., a digital signal processor (DSP)), a microcontroller, a programmable gate array, etc. The processor 1207 may be referred to as a central processing unit (CPU). Although just a single processor 1207 is shown in the base station 1218 of FIG. 12, in an alternative configuration, a combination of processors (e.g., an ARM and DSP) could be used.

The base station 1218 also includes memory 1290 in electronic communication with the processor 1207 (i.e., the processor 1207 can read information from and/or write information to the memory 1290). The memory 1290 may be any electronic component capable of storing electronic information. The memory 1290 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1292a and instructions 1294a may be stored in the memory 1290. The instructions 1294a may include one or more programs, routines, sub-routines, functions, procedures, etc. The instructions 1294a may include a single computer-readable statement or many computer-readable statements. The instructions 1294a may be executable by the processor 1207 to implement the method 300 described above. Executing the instructions 1294a may involve the use of the data 1292a that is stored in the memory 1290. FIG. 12 shows some instructions 1294b and data 1292b being loaded into the processor 1207.

The base station 1218 may also include a transmitter 1201 and a receiver 1203 to allow transmission and reception of signals between the base station 1218 and a remote location (e.g., a wireless communication device). The transmitter 1201 and receiver 1203 may be collectively referred to as a transceiver 1298. An antenna 1296 may be electrically coupled to the transceiver 1298. The base station 1218 may also include (not shown) multiple transmitters, multiple receivers, multiple transceivers and/or multiple antenna.

The various components of the base station 1218 may be coupled together by one or more buses, which may include a power bus, a control signal bus, a status signal bus, a data bus, etc. For simplicity, the various buses are illustrated in FIG. 12 as a bus system 1205.

FIG. 13 shows an example of a timeline 1300 according to alternative-1 for HARQ timing for TTI bundling in FDD. In this timeline 1300 there is a bundling size of three subframes.

FIG. 14 shows an example of a timeline 1400 according to alternative-2 for HARQ timing for TTI bundling in FDD. In this timeline 1400 there is a bundling size of three subframes.

FIG. 15 shows an example of a timeline 1500 according to alternative-3 for HARQ timing for TTI bundling in FDD. In this timeline 1500 there is a bundling size of three subframes.

FIG. 16 shows an example of a timeline 1600 according to an alternative for HARQ timing for TTI bundling in FDD with a bundling size of four subframes. In this timeline 1600 the HARQ RTT is fixed at 16 milliseconds (ms).

FIG. 17 shows an example of a timeline 1700 for HARQ timing for TTI bundling in TDD DL/UL configuration 0. In this timeline 1700, the bundling size is fixed at four subframes.

FIG. 18 shows an example of a timeline 1800 for HARQ timing for TTI bundling in TDD DL/UL configuration 1. In this timeline 1800, the bundling size is fixed at four subframes.

FIG. 19 shows an example of a timeline 1900 for HARQ timing for TTI bundling in TDD DL/UL configuration 6. In this timeline 1900, the bundling size is fixed at four subframes.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "couple" and any variations thereof may indicate a direct or indirect connection between elements. For example, a first element coupled to a second element may be directly connected to the second element, or indirectly connected to the second element through another element.

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for determining transmission time interval (TTI) bundling parameters on a wireless communication device, comprising:
   receiving signaling that indicates a TTI bundling configuration;
   receiving signaling that indicates an uplink grant;
   determining at least one TTI bundling parameter based on the TTI bundling configuration and the uplink grant, wherein determining the at least one TTI bundling parameter comprises determining a subset of subframes for uplink shared channel (UL-SCH) transmissions; and
   transmitting a signal based on the at least one TTI bundling parameter.

2. The method of claim 1, wherein determining the at least one TTI bundling parameter further comprises determining one or more uplink hybrid automatic repeat request (UL-HARQ) processes for uplink shared channel (UL-SCH) transmissions.

3. The method of claim 1, wherein determining the at least one TTI bundling parameter further comprises determining a transport block size (TBS) determination scheme.

4. The method of claim 3, wherein determining the TBS determination scheme is based on at least one of a group consisting of semi-static, dynamic signaling and implicit signaling.

5. The method of claim 1, wherein determining the at least one TTI bundling parameter further comprises determining a redundancy version (RV) determination scheme.

6. The method of claim 5, wherein determining the RV determination scheme is based on at least one of a group consisting of a transport block size (TBS) determination scheme, systematic bits, two or more subframes and eight RV values.

7. The method of claim 5, wherein determining the RV determination scheme is based on signaling that is separate from transport block size (TBS) determination scheme signaling or is based on a TBS determination scheme.

8. The method of claim 1, wherein determining the at least one TTI bundling parameter further comprises determining whether TTI bundling is enabled for uplink multiple-input multiple-output (UL-MIMO) transmissions.

9. The method of claim 8, wherein determining the at least one TTI bundling parameter further comprises determining a TTI bundling size based on whether TTI bundling is enabled for UL-MIMO transmissions.

10. The method of claim 8, wherein determining the at least one TTI bundling parameter further comprises determining at least one of a transport block size (TBS) determination scheme and a redundancy version (RV) determination scheme based on whether TTI bundling is enabled for UL-MIMO transmissions.

11. The method of claim 8, wherein whether TTI bundling is enabled for rank-1 UL-MIMO transmissions is determined based on a downlink control information (DCI) format 4.

12. The method of claim 11, wherein a same beamforming vector is applied to all subframes involved in TTI bundling or a beamforming vector follows a predefined pattern if TTI bundling is enabled for UL-MIMO transmissions.

13. The method of claim 11, wherein a beamforming vector is applied for all semi-persistent scheduled (SPS) transmissions without a physical downlink control channel (PDCCH) if the DCI format 4 is used to activate uplink semi-persistent scheduling.

14. The method of claim 11, wherein a beamforming vector is applied for all physical uplink shared channel (PUSCH) transmissions without a physical downlink control channel (PDCCH), and wherein the beamforming vector comprises one of a group consisting of a beamforming vector following a latest beamforming vector, a beamforming vector following a fixed beamforming vector and a beamforming vector based on wireless communication device implementation.

15. The method of claim 1, wherein determining the at least one TTI bundling parameter further comprises determining at least one of a TTI bundling size, a transport block size (TBS) determination scheme and a redundancy version (RV) determination scheme based on a downlink control information (DCI) format 0 or a DCI format 4.

16. The method of claim 1, wherein determining the at least one TTI bundling parameter further comprises determining whether to multiplex channel state information (CSI) with uplink shared channel (UL-SCH) information in a TTI bundling.

17. The method of claim 16, wherein determining whether to multiplex the CSI is based on explicit or implicit signaling.

18. The method of claim 16, wherein only certain types of CSI are multiplexed if it is determined to multiplex CSI.

19. The method of claim 16, wherein determining whether to multiplex CSI is based on power limitation conditions.

20. The method of claim 16, wherein uplink control information (UCI) is piggybacked onto a physical uplink shared channel (PUSCH) for a single subframe or TTI bundling for UCI is allowed.

21. The method of claim 16, wherein acknowledgement/negative acknowledgement (ACK/NAK) is multiplexed onto a physical uplink shared channel (PUSCH) with TTI bundling.

22. The method of claim 1, wherein determining the at least one TTI bundling parameter further comprises determining whether subframes in a TTI bundling are consecutive or non-consecutive.

23. A method for determining transmission time interval (TTI) bundling parameters on a base station, comprising:
   determining at least one TTI bundling parameter, wherein determining the at least one TTI bundling parameter comprises determining a subset of subframes for uplink shared channel (UL-SCH) transmissions;
   indicating the at least one TTI bundling parameter based on a TTI bundling configuration and an uplink grant; and
   receiving a signal based on the at least one TTI bundling parameter.

24. The method of claim 23, wherein determining the at least one TTI bundling parameter further comprises determining one or more uplink hybrid automatic repeat request (UL-HARQ) processes for uplink shared channel (UL-SCH) transmissions.

25. The method of claim 23, wherein determining the at least one TTI bundling parameter further comprises determining at least one of a transport block size (TBS) determination scheme and a redundancy version (RV) determination scheme.

26. The method of claim 23, wherein determining the at least one TTI bundling parameter further comprises determining at least one of a TTI bundling size, a transport block size (TBS) determination scheme and a redundancy version (RV) determination scheme based on a downlink control information (DCI) format 0 or a DCI format 4.

27. The method of claim 23, wherein determining the at least one TTI bundling parameter further comprises determining whether to multiplex channel state information (CSI) with uplink shared channel (UL-SCH) information in a TTI bundling.

28. A wireless communication device for determining transmission time interval (TTI) bundling parameters, comprising:
memory; and
a processor in communication with the memory, the processor and the memory configured to:
receive signaling that indicates a TTI bundling configuration,
receive signaling that indicates an uplink grant,
determine at least one TTI bundling parameter based on the TTI bundling configuration and the uplink grant, wherein to determine the at least one TTI bundling parameter, the processor and the memory are configured to determine a subset of subframes for uplink shared channel (UL-SCH) transmissions, and
transmit a signal based on the at least one TTI bundling parameter.

29. The wireless communication device of claim 28, wherein to determine the at least one TTI bundling parameter, the-processor and the memory are further configured to determine one or more uplink hybrid automatic repeat request (UL-HARQ) processes for uplink shared channel (UL-SCH) transmissions.

30. The wireless communication device of claim 28, wherein to determine the at least one TTI bundling parameter, the-processor and the memory are further configured to determine a transport block size (TBS) determination scheme.

31. The wireless communication device of claim 30, wherein determining the TBS determination scheme is based on at least one of a group consisting of semi-static, dynamic signaling and implicit signaling.

32. The wireless communication device of claim 28, wherein to determine the at least one TTI bundling parameter, the processor and the memory are further configured to determine a redundancy version (RV) determination scheme.

33. The wireless communication device of claim 32, wherein determining the RV determination scheme is based on at least one of a group consisting of a transport block size (TBS) determination scheme, systematic bits, two or more subframes and eight RV values.

34. The wireless communication device of claim 32, wherein determining the RV determination scheme is based on signaling that is separate from transport block size (TBS) determination scheme signaling or is based on a TBS determination scheme.

35. The wireless communication device of claim 28, wherein to determine the at least one TTI bundling parameter, the processor and the memory are further configured to determine whether TTI bundling is enabled for uplink multiple-input multiple-output (UL-MIMO) transmissions.

36. The wireless communication device of claim 35, wherein to determine the at least one TTI bundling parameter, the processor and the memory are further configured to determine a TTI bundling size based on whether TTI bundling is enabled for UL-MIMO transmissions.

37. The wireless communication device of claim 35, wherein to determine the at least one TTI bundling parameter, the processor and the memory are further configured to determine at least one of a transport block size (TBS) determination scheme and a redundancy version (RV) determination scheme based on whether TTI bundling is enabled for UL-MIMO transmissions.

38. The wireless communication device of claim 35, wherein whether TTI bundling is enabled for rank-1 UL-MIMO transmissions is determined based on a downlink control information (DCI) format 4.

39. The wireless communication device of claim 38, wherein a same beamforming vector is applied to all subframes involved in TTI bundling or a beamforming vector follows a predefined pattern if TTI bundling is enabled for UL-MIMO transmissions.

40. The wireless communication device of claim 38, wherein a beamforming vector is applied for all semi-persistent scheduled (SPS) transmissions without a physical downlink control channel (PDCCH) if the DCI format 4 is used to activate uplink semi-persistent scheduling.

41. The wireless communication device of claim 38, wherein a beamforming vector is applied for all physical uplink shared channel (PUSCH) transmissions without a physical downlink control channel (PDCCH), and wherein the beamforming vector comprises one of a group consisting of a beamforming vector following a latest beamforming vector, a beamforming vector following a fixed beamforming vector and a beamforming vector based on wireless communication device implementation.

42. The wireless communication device of claim 28, wherein to determine the at least one TTI bundling parameter, the processor and the memory are further configured to determine at least one of a TTI bundling size, a transport block size (TBS) determination scheme and a redundancy version (RV) determination scheme based on a downlink control information (DCI) format 0 or a DCI format 4.

43. The wireless communication device of claim 28, wherein to determine the at least one TTI bundling parameter, the processor and the memory are further configured to determine whether to multiplex channel state information (CSI) with uplink shared channel (UL-SCH) information in a TTI bundling.

44. The wireless communication device of claim 43, wherein determining whether to multiplex the CSI is based on explicit or implicit signaling.

45. The wireless communication device of claim 43, wherein only certain types of CSI are multiplexed if it is determined to multiplex CSI.

46. The wireless communication device of claim 43, wherein determining whether to multiplex CSI is based on power limitation conditions.

47. The wireless communication device of claim 43, wherein uplink control information (UCI) is piggybacked onto a physical uplink shared channel (PUSCH) for a single subframe or TTI bundling for UCI is allowed.

48. The wireless communication device of claim 43, wherein acknowledgement/negative acknowledgement (ACK/NAK) is multiplexed onto a physical uplink shared channel (PUSCH) with TTI bundling.

49. The wireless communication device of claim 28, wherein to determine the at least one TTI bundling parameter, the processor and the memory are further configured to determine whether subframes in a TTI bundling are consecutive or non-consecutive.

50. A computer-program product for determining transmission time interval (TTI) bundling parameters, comprising a non-transitory tangible computer-readable medium having instructions thereon, the instructions comprising:
code for causing a wireless communication device to receive signaling that indicates a TTI bundling configuration;
code for causing the wireless communication device to receive signaling that indicates an uplink grant;
code for causing the wireless communication device to determine at least one TTI bundling parameter based on the TTI bundling configuration and the uplink grant, wherein the code for causing the wireless communication device to determine the at least one TTI bundling parameter comprises code for causing the wireless communication device to determine a subset of subframes for uplink shared channel (UL-SCH) transmissions; and
code for causing the wireless communication device to transmit a signal based on the at least one TTI bundling parameter.

51. The computer-program product of claim 50, wherein the code for causing the wireless communication device to determine the at least one TTI bundling parameter further comprises code for causing the wireless communication device to determine one or more uplink hybrid automatic repeat request (UL-HARQ) processes for uplink shared channel (UL-SCH) transmissions.

52. The computer-program product of claim 50, wherein the code for causing the wireless communication device to determine the at least one TTI bundling parameter further comprises code for causing the wireless communication device to determine at least one of a transport block size (TBS) determination scheme and a redundancy version (RV) determination scheme.

53. The computer-program product of claim 50, wherein the code for causing the wireless communication device to determine the at least one TTI bundling parameter further comprises code for causing the wireless communication device to determine at least one of a TTI bundling size, a transport block size (TBS) determination scheme and a redundancy version (RV) determination scheme based on a downlink control information (DCI) format 0 or a DCI format 4.

54. The computer-program product of claim 50, wherein the code for causing the wireless communication device to determine the at least one TTI bundling parameter further comprises code for causing the wireless communication device to determine whether to multiplex channel state information (CSI) with uplink shared channel (UL-SCH) information in a TTI bundling.

55. An apparatus for determining transmission time interval (TTI) bundling parameters, comprising:
means for receiving signaling that indicates a TTI bundling configuration;
means for receiving signaling that indicates an uplink grant;
means for determining at least one TTI bundling parameter based on the TTI bundling configuration and the uplink grant, wherein the means for determining the at least one TTI bundling parameter comprises means for determining a subset of subframes for uplink shared channel (UL-SCH) transmissions; and
means for transmitting a signal based on the at least one TTI bundling parameter.

56. The apparatus of claim 55, wherein the means for determining the at least one TTI bundling parameter further comprises means for determining one or more uplink hybrid automatic repeat request (UL-HARQ) processes for uplink shared channel (UL-SCH) transmissions.

57. The apparatus of claim 55, wherein the means for determining the at least one TTI bundling parameter further comprises means for determining at least one of a transport block size (TBS) determination scheme and a redundancy version (RV) determination scheme.

58. The apparatus of claim 55, wherein the means for determining the at least one TTI bundling parameter further comprises means for determining at least one of a TTI bundling size, a transport block size (TBS) determination scheme and a redundancy version (RV) determination scheme based on a downlink control information (DCI) format 0 or a DCI format 4.

59. The apparatus of claim 55, wherein the means for determining the at least one TTI bundling parameter further comprises means for determining whether to multiplex channel state information (CSI) with uplink shared channel (UL-SCH) information in a TTI bundling.

* * * * *

UNITED STATES PATENT AND TRADEMARK OFFICE
CERTIFICATE OF CORRECTION

PATENT NO.        : 9,295,056 B2
APPLICATION NO.   : 13/804307
DATED             : March 22, 2016
INVENTOR(S)       : Wanshi Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 316 days.

Signed and Sealed this
Nineteenth Day of July, 2016

Michelle K. Lee
*Director of the United States Patent and Trademark Office*